(12) United States Patent
Olson et al.

(10) Patent No.: US 12,031,565 B2
(45) Date of Patent: Jul. 9, 2024

(54) SUCTION MOUNT AND BRACKETS AND ACCESSORIES THEREFOR

(71) Applicant: Olson IP Technologies, Inc., Mundelein, IL (US)

(72) Inventors: Erik Olson, Deerfield Beach, FL (US); Richard Carl Olson, Deerfield Beach, FL (US)

(73) Assignee: Olson IP Technologies, Inc., Mundelein, IL (US)

( * ) Notice: Subject to any disclaimer, the term of this patent is extended or adjusted under 35 U.S.C. 154(b) by 126 days.

(21) Appl. No.: 17/131,382

(22) Filed: Dec. 22, 2020

(65) Prior Publication Data

US 2021/0215193 A1 Jul. 15, 2021

Related U.S. Application Data

(60) Provisional application No. 62/959,424, filed on Jan. 10, 2020.

(51) Int. Cl.
| | |
|---|---|
| *F16B 47/00* | (2006.01) |
| *A47G 1/17* | (2006.01) |
| *F16M 13/02* | (2006.01) |
| *B60R 11/00* | (2006.01) |

(52) U.S. Cl.
CPC .............. *F16B 47/00* (2013.01); *A47G 1/17* (2013.01); *F16B 47/006* (2013.01); *F16M 13/022* (2013.01); *B60R 2011/0056* (2013.01); *F16B 2200/83* (2023.08)

(58) Field of Classification Search
CPC .......... F16B 7/00; F16B 47/00; F16B 47/006; F16M 11/00; F16M 13/00; F16M 13/02; F16M 13/022; F16M 2200/00; F16M 2200/022; A47G 1/17; B60R 2011/0056
See application file for complete search history.

(56) References Cited

U.S. PATENT DOCUMENTS

| | | |
|---|---|---|
| 453,631 A | 6/1891 | Farley |
| 666,467 A | 1/1901 | Clark |
| 1,374,026 A | 4/1921 | Nelson |
| 1,401,727 A | 12/1921 | Pimlott |
| 1,679,881 A | 8/1928 | Simpson |
| 1,756,716 A | 4/1930 | Whitney |

(Continued)

OTHER PUBLICATIONS

"Curtain Rod Bracket." More than one year before Feb. 23, 2018, 2 pages.

(Continued)

*Primary Examiner* — Monica E Millner
(74) *Attorney, Agent, or Firm* — Fitch, Even, Tabin & Flannery, LLP

(57) ABSTRACT

Unibody suction mount having a compact design allows for a plurality of products to be fastened onto the mount. The mount portion includes an integral threaded portion that cooperates with suction cup having a threaded post. The mount includes direct engagement with the suction cup to hold the suction cup in place as the vacuum is being created in the suction cup. The suction mount utilizes one or more nuts to allow for attachments to be fastened onto the suction mount. The attachments may include a variety of brackets used to connect a variety of accessories. The accessories can be designed for specific activities.

35 Claims, 25 Drawing Sheets

(56) References Cited

U.S. PATENT DOCUMENTS

| | | | | |
|---|---|---|---|---|
| 1,837,340 | A | 12/1931 | Schwartz | |
| 1,951,660 | A | 3/1934 | Klaudt | |
| 2,275,330 | A | 3/1942 | Tveten | |
| 2,293,168 | A | 8/1942 | Pirone | |
| 2,637,555 | A | 5/1953 | Klaudt | |
| 2,661,850 | A | 12/1953 | Fowler | |
| 2,903,141 | A | 9/1959 | Seewack | |
| 2,974,806 | A | 3/1961 | Seewack | |
| 3,004,743 | A | 10/1961 | Wenger | |
| 3,180,604 | A | 4/1965 | Hammer | |
| 3,240,461 | A * | 3/1966 | Singleton | F16B 47/00 248/314 |
| 3,560,032 | A | 2/1971 | Cohen | |
| 3,674,294 | A | 7/1972 | Kirkham | |
| 4,012,007 | A * | 3/1977 | Cunningham | A47K 10/3836 248/205.8 |
| 4,012,961 | A | 3/1977 | Cameron | |
| 4,133,575 | A * | 1/1979 | Mader | B60J 1/20 248/205.8 |
| 4,134,703 | A | 1/1979 | Hinners | |
| 4,147,199 | A | 4/1979 | Cameron | |
| 4,254,815 | A | 3/1981 | Comeau | |
| 4,274,467 | A | 6/1981 | Comeau | |
| 4,276,920 | A | 7/1981 | Comeau | |
| 4,301,852 | A | 11/1981 | Comeau | |
| 4,419,026 | A | 12/1983 | Leto | |
| 4,438,799 | A | 3/1984 | Comeau | |
| 4,471,275 | A | 9/1984 | Comeau | |
| 4,492,262 | A | 1/1985 | Comeau | |
| 4,495,671 | A | 1/1985 | Comeau | |
| 4,519,433 | A | 5/1985 | Comeau | |
| D285,044 | S | 8/1986 | Mockett | |
| 4,607,677 | A | 8/1986 | Comeau | |
| 4,619,305 | A | 10/1986 | Comeau | |
| 4,712,457 | A | 12/1987 | Percivalle | |
| 4,895,471 | A | 1/1990 | Geltz | |
| 4,919,185 | A | 4/1990 | Comeau | |
| 4,934,640 | A * | 6/1990 | Bichon | A47K 5/02 D6/540 |
| 4,955,421 | A | 9/1990 | Torti | |
| D324,328 | S | 3/1992 | Pagan | |
| 5,104,077 | A * | 4/1992 | Liu | A47K 5/00 248/205.8 |
| D327,421 | S | 6/1992 | Pagan | |
| D329,294 | S | 9/1992 | Dubeau | |
| 5,143,336 | A | 9/1992 | McMichael | |
| 5,156,281 | A | 10/1992 | Schwartz | |
| 5,180,130 | A | 1/1993 | McMichael | |
| 5,259,520 | A | 11/1993 | Roggio | |
| 5,303,832 | A | 4/1994 | Tu | |
| D346,699 | S | 5/1994 | Greger | |
| D349,002 | S | 7/1994 | Greger | |
| 5,330,061 | A | 7/1994 | Geltz | |
| 5,333,665 | A | 8/1994 | Safar | |
| D356,725 | S | 3/1995 | McMichael | |
| 5,433,551 | A | 7/1995 | Gordon | |
| D364,767 | S | 12/1995 | McLinden | |
| 5,495,884 | A * | 3/1996 | Shikler | B60J 1/208 248/205.5 |
| D371,829 | S | 7/1996 | Greger | |
| D372,963 | S | 8/1996 | Luca, Jr. | |
| 5,544,692 | A | 8/1996 | McMichael | |
| 5,564,666 | A | 10/1996 | Pfeil | |
| 5,590,804 | A * | 1/1997 | Crum | A47L 19/04 220/483 |
| 5,615,721 | A | 4/1997 | Winter | |
| D380,141 | S | 6/1997 | McMichael | |
| 5,653,057 | A | 8/1997 | Gary | |
| D383,921 | S | 9/1997 | Newkirk | |
| D385,478 | S | 10/1997 | Luca, Jr. | |
| 5,673,884 | A * | 10/1997 | Yemini | A47K 1/09 248/220.21 |
| 5,678,703 | A | 10/1997 | Sawyer | |
| D388,267 | S | 12/1997 | Newkirk | |
| 5,702,010 | A | 12/1997 | Liang | |
| D388,642 | S | 1/1998 | Winter | |
| D388,693 | S | 1/1998 | Luca, Jr. | |
| D389,352 | S | 1/1998 | Pagan-Demirtas | |
| D391,842 | S | 3/1998 | Sartini | |
| D392,135 | S | 3/1998 | Pagan-Demirtas | |
| D392,484 | S | 3/1998 | Yemini | |
| D394,771 | S | 6/1998 | Hofman | |
| 5,771,726 | A | 6/1998 | Bibby | |
| D395,773 | S | 7/1998 | Hofman | |
| D395,971 | S | 7/1998 | Hofman | |
| D396,157 | S | 7/1998 | Hofman | |
| D396,585 | S | 8/1998 | Hofman | |
| D397,567 | S | 9/1998 | Hofman | |
| D398,468 | S | 9/1998 | Yemini | |
| D404,639 | S | 1/1999 | Samelson | |
| D404,948 | S | 2/1999 | Yemini | |
| D407,934 | S | 4/1999 | Wojtowicz | |
| D408,185 | S | 4/1999 | Hofman | |
| D408,272 | S | 4/1999 | Caron | |
| D408,721 | S | 4/1999 | Sartini | |
| D408,722 | S | 4/1999 | Sartini | |
| 5,894,610 | A | 4/1999 | Winter | |
| D409,424 | S | 5/1999 | Hofman | |
| D409,898 | S | 5/1999 | Bredemeier | |
| D410,193 | S | 5/1999 | Bredemeier | |
| D410,361 | S | 6/1999 | Baranski | |
| D410,377 | S | 6/1999 | Bredemeier | |
| D411,951 | S | 7/1999 | Baranski | |
| D412,433 | S | 8/1999 | Bredemeier | |
| D412,827 | S | 8/1999 | Bredemeier | |
| 5,971,192 | A * | 10/1999 | Immerman | A47K 5/02 220/DIG. 13 |
| D415,916 | S | 11/1999 | Hofman | |
| D416,416 | S | 11/1999 | Kelso | |
| D416,728 | S | 11/1999 | Kelso | |
| D417,390 | S | 12/1999 | Hofman | |
| D417,605 | S | 12/1999 | Sartini | |
| D417,809 | S | 12/1999 | Hofman | |
| D417,990 | S | 12/1999 | Yemini | |
| D417,991 | S | 12/1999 | Hofman | |
| 5,996,674 | A | 12/1999 | Gatewood | |
| 5,996,791 | A | 12/1999 | Bibby | |
| D421,692 | S | 3/2000 | Wojtowicz | |
| 6,045,111 | A | 4/2000 | Hsieh | |
| D426,763 | S | 6/2000 | Adler | |
| D426,992 | S | 6/2000 | Walker | |
| D429,934 | S | 8/2000 | Hofman | |
| D433,618 | S | 11/2000 | Bredemeier | |
| D436,487 | S | 1/2001 | Walker | |
| D437,693 | S | 2/2001 | Harwanko | |
| 6,193,197 | B1 | 2/2001 | Lian | |
| D438,448 | S | 3/2001 | Batting | |
| D442,394 | S | 5/2001 | Walker | |
| D443,162 | S | 6/2001 | Winter | |
| D443,813 | S | 6/2001 | Harwanko | |
| D444,017 | S | 6/2001 | Walker | |
| 6,250,839 | B1 | 6/2001 | Lenhart | |
| D450,947 | S | 11/2001 | Walker | |
| 6,317,904 | B1 | 11/2001 | Samelson | |
| D453,652 | S | 2/2002 | Walker | |
| D454,730 | S | 3/2002 | Harwanko | |
| D456,167 | S | 4/2002 | Harwanko | |
| D456,638 | S | 5/2002 | Walker | |
| D456,658 | S | 5/2002 | Harwanko | |
| D458,790 | S | 6/2002 | Harwanko | |
| D458,791 | S | 6/2002 | Harwanko | |
| D459,201 | S | 6/2002 | Michaelson | |
| 6,443,207 | B1 | 9/2002 | Cheng | |
| D464,867 | S | 10/2002 | Samelson | |
| D465,996 | S | 11/2002 | Suero, Jr. | |
| 6,478,271 | B1 | 11/2002 | Mulholland | |
| D466,798 | S | 12/2002 | Rebman | |
| D466,799 | S | 12/2002 | Suero, Jr. | |
| D470,332 | S | 2/2003 | Clucas | |
| D470,337 | S | 2/2003 | Clucas | |
| D470,394 | S | 2/2003 | Harwanko | |
| 6,530,120 | B2 | 3/2003 | Samelson | |

(56) References Cited

U.S. PATENT DOCUMENTS

| | | | |
|---|---|---|---|
| 6,530,502 B2 * | 3/2003 | Neal | A47L 17/00 222/135 |
| D472,453 S | 4/2003 | Rebman | |
| D472,747 S | 4/2003 | Walker | |
| D472,748 S | 4/2003 | Walker | |
| 6,543,629 B1 | 4/2003 | Samelson | |
| D475,229 S | 6/2003 | Suero, Jr. | |
| D475,551 S | 6/2003 | Kelso | |
| D475,560 S | 6/2003 | Suero, Jr. | |
| D475,561 S | 6/2003 | Suero, Jr. | |
| D475,562 S | 6/2003 | Suero, Jr. | |
| D475,857 S | 6/2003 | Harwanko | |
| D476,828 S | 7/2003 | Harwanko | |
| D479,932 S | 9/2003 | Clucas | |
| D482,223 S | 11/2003 | Bibby | |
| 6,640,867 B1 | 11/2003 | Pallotta | |
| 6,651,831 B2 | 11/2003 | Samelson | |
| D483,251 S | 12/2003 | Suero, Jr. | |
| D483,969 S | 12/2003 | Maholick | |
| D484,027 S | 12/2003 | Clucas | |
| D484,345 S | 12/2003 | Clucas | |
| 6,663,064 B1 * | 12/2003 | Minelli | B60R 11/00 248/205.5 |
| 6,663,077 B2 * | 12/2003 | Zou | F16B 47/00 248/205.8 |
| 6,666,420 B1 | 12/2003 | Carnevali | |
| 6,669,033 B1 * | 12/2003 | Lian | F16B 47/00 D6/540 |
| D485,104 S | 1/2004 | Suero, Jr. | |
| D485,462 S | 1/2004 | Suero, Jr. | |
| D485,464 S | 1/2004 | Clucas | |
| 6,681,831 B1 | 1/2004 | Cheng | |
| D487,653 S | 3/2004 | Harwanko | |
| D488,004 S | 4/2004 | Clucas | |
| D488,319 S | 4/2004 | Harwanko | |
| D488,945 S | 4/2004 | Bibby | |
| D490,253 S | 5/2004 | Clucas | |
| D491,445 S | 6/2004 | Clucas | |
| D491,448 S | 6/2004 | Rebman | |
| D491,731 S | 6/2004 | Harwanko | |
| D491,742 S | 6/2004 | Harwanko | |
| D491,751 S | 6/2004 | Harwanko | |
| D491,752 S | 6/2004 | Harwanko | |
| 6,761,202 B1 | 7/2004 | Cheng | |
| D494,052 S | 8/2004 | Winter | |
| D494,455 S | 8/2004 | Winter | |
| D494,845 S | 8/2004 | Winter | |
| 6,776,368 B1 * | 8/2004 | Duncan | A47K 10/3836 242/597.7 |
| D495,523 S | 9/2004 | Harwanko | |
| D495,528 S | 9/2004 | Harwanko | |
| D495,591 S | 9/2004 | Clucas | |
| D498,630 S | 11/2004 | Suero, Jr. | |
| 6,823,925 B2 | 11/2004 | Militello | |
| 6,824,000 B2 | 11/2004 | Samelson | |
| D499,286 S | 12/2004 | Harwanko | |
| D499,296 S | 12/2004 | Suero, Jr. | |
| D499,329 S | 12/2004 | Suero, Jr. | |
| D500,225 S | 12/2004 | Suero, Jr. | |
| D500,670 S | 1/2005 | Rebman | |
| D501,106 S | 1/2005 | Suero, Jr. | |
| 6,865,817 B2 | 3/2005 | Militello | |
| D504,310 S | 4/2005 | Harwanko | |
| D504,807 S | 5/2005 | Harwanko | |
| D505,062 S | 5/2005 | Suero, Jr. | |
| D505,317 S | 5/2005 | Harwanko | |
| D505,614 S | 5/2005 | Barrese | |
| 6,895,642 B2 * | 5/2005 | Huang | A47G 1/17 248/205.5 |
| 6,896,228 B1 * | 5/2005 | Lu | A47K 10/10 248/205.8 |
| 6,948,545 B1 | 9/2005 | Cheng | |
| 6,959,752 B2 | 11/2005 | Huang | |
| 6,962,186 B2 | 11/2005 | Hsu | |
| 6,966,353 B2 | 11/2005 | Hsu | |
| 6,966,530 B2 | 11/2005 | Hsu | |
| D513,142 S | 12/2005 | Suero, Jr. | |
| D513,373 S | 1/2006 | Harwanko | |
| 6,994,143 B2 | 2/2006 | McCarty | |
| 7,000,521 B1 | 2/2006 | Cheng | |
| D516,902 S | 3/2006 | Harwanko | |
| D522,844 S | 6/2006 | Harwanko | |
| D522,845 S | 6/2006 | Suero, Jr. | |
| D522,846 S | 6/2006 | Suero, Jr. | |
| D522,847 S | 6/2006 | Suero, Jr. | |
| D525,115 S | 7/2006 | Harwanko | |
| D525,813 S | 8/2006 | Beasley | |
| D526,520 S | 8/2006 | Clucas | |
| D527,246 S | 8/2006 | Clucas | |
| 7,128,124 B2 | 10/2006 | Bibby | |
| D534,793 S | 1/2007 | Suero, Jr. | |
| D538,571 S | 3/2007 | Militello | |
| D539,064 S | 3/2007 | Militello | |
| 7,194,811 B2 | 3/2007 | Militello | |
| 7,195,051 B2 | 3/2007 | Nien | |
| D540,568 S | 4/2007 | Clucas | |
| D542,392 S | 5/2007 | Hanley | |
| D542,897 S | 5/2007 | Harwanko | |
| D543,747 S | 6/2007 | Harwanko | |
| D543,748 S | 6/2007 | Harwanko | |
| D544,786 S | 6/2007 | Barrese | |
| D545,180 S | 6/2007 | Harwanko | |
| 7,225,850 B2 | 6/2007 | McCarty | |
| D546,177 S | 7/2007 | El-Afandi | |
| D547,165 S | 7/2007 | Barrese | |
| D547,166 S | 7/2007 | Barrese | |
| D547,167 S | 7/2007 | Barrese | |
| D548,042 S | 8/2007 | Smyczek | |
| D548,574 S | 8/2007 | Harwanko | |
| D549,506 S | 8/2007 | Stacy | |
| 7,255,149 B2 | 8/2007 | Rossato | |
| D551,010 S | 9/2007 | Woodhouse | |
| 7,264,035 B2 | 9/2007 | Rossato | |
| D560,924 S | 2/2008 | Walker | |
| D562,608 S | 2/2008 | Kramer | |
| D562,609 S | 2/2008 | Kramer | |
| 7,331,370 B1 | 2/2008 | Militello | |
| D563,136 S | 3/2008 | Kramer | |
| D563,138 S | 3/2008 | Kramer | |
| D563,209 S | 3/2008 | Samelson | |
| D566,991 S | 4/2008 | Harwanko | |
| D568,656 S | 5/2008 | Kramer | |
| D569,149 S | 5/2008 | Walker | |
| D569,668 S | 5/2008 | Kramer | |
| D571,136 S | 6/2008 | Kramer | |
| D573,386 S | 7/2008 | Clucas | |
| D573,387 S | 7/2008 | Walker | |
| 7,407,237 B2 | 8/2008 | Bright | |
| D576,475 S | 9/2008 | Didehvar | |
| D576,476 S | 9/2008 | Didehvar | |
| D577,281 S | 9/2008 | Barrese | |
| D582,760 S | 12/2008 | Barrese | |
| D586,647 S | 2/2009 | Didehvar | |
| D587,917 S | 3/2009 | Barrese | |
| D590,238 S | 4/2009 | Richter | |
| D590,696 S | 4/2009 | Carnevali | |
| D591,142 S | 4/2009 | Cittadino | |
| D591,522 S | 5/2009 | Barrese | |
| 7,549,615 B2 | 6/2009 | Shevick | |
| 7,562,689 B1 | 7/2009 | Militello | |
| 7,578,487 B2 | 8/2009 | Kaneda | |
| D599,140 S | 9/2009 | Winter | |
| 7,600,549 B2 | 10/2009 | Cheng | |
| 7,607,622 B2 | 10/2009 | Carnevali | |
| 7,628,362 B2 * | 12/2009 | Song | F16B 47/003 248/205.8 |
| D607,309 S | 1/2010 | Barrese | |
| 7,665,500 B2 | 2/2010 | Rossato | |
| D611,328 S | 3/2010 | Hanley | |
| D611,329 S | 3/2010 | Barrese | |
| D611,330 S | 3/2010 | Barrese | |
| D614,478 S | 4/2010 | Barrese | |
| D614,479 S | 4/2010 | Barrese | |

(56) References Cited

U.S. PATENT DOCUMENTS

| | | |
|---|---|---|
| D614,938 S | 5/2010 | Barrese |
| D614,939 S | 5/2010 | Barrese |
| 7,708,245 B2 | 5/2010 | Woo |
| 7,712,720 B1 | 5/2010 | Cheng |
| D618,538 S | 6/2010 | Barrese |
| 7,748,673 B2 | 7/2010 | Barrese |
| D624,807 S | 10/2010 | Barrese |
| D625,987 S | 10/2010 | Barrese |
| 7,819,166 B2 | 10/2010 | Militello |
| D628,000 S | 11/2010 | Lindo |
| D628,875 S | 12/2010 | Padilla |
| 7,850,133 B2 | 12/2010 | Carnevali |
| 7,857,151 B2 | 12/2010 | Barrese |
| D630,088 S | 1/2011 | Kim |
| D630,089 S | 1/2011 | Kim |
| D630,498 S | 1/2011 | Kim |
| D632,513 S | 2/2011 | Cittadino |
| D632,514 S | 2/2011 | Didehvar |
| D632,515 S | 2/2011 | Cittadino |
| 7,877,824 B2 | 2/2011 | Grant |
| D633,780 S | 3/2011 | Barrese |
| D635,807 S | 4/2011 | Lindo |
| 7,926,127 B2 | 4/2011 | Barrese |
| D637,854 S | 5/2011 | Desanto |
| D637,856 S | 5/2011 | Labarre |
| D637,892 S | 5/2011 | Barrese |
| D640,488 S | 6/2011 | Didehvar |
| D641,190 S | 7/2011 | Cittadino |
| D641,191 S | 7/2011 | Walker |
| D641,193 S | 7/2011 | Vaccaro |
| D641,194 S | 7/2011 | Vaccaro |
| 7,975,971 B2 | 7/2011 | Carnevali |
| 7,984,814 B2 | 7/2011 | Didehvar |
| D643,236 S | 8/2011 | Cittadino |
| D643,657 S | 8/2011 | Cittadino |
| D644,050 S | 8/2011 | Cittadino |
| D646,558 S | 10/2011 | Murray |
| D647,391 S | 10/2011 | Barrese |
| D648,969 S | 11/2011 | Cittadino |
| D649,019 S | 11/2011 | Kim |
| D649,020 S | 11/2011 | Kim |
| D649,352 S | 11/2011 | Cittadino |
| 8,056,873 B1 | 11/2011 | Hanley |
| D650,263 S | 12/2011 | Barrese |
| 8,069,507 B2 | 12/2011 | Didehvar |
| 8,069,999 B2 | 12/2011 | Kaveh |
| 8,079,557 B2 | 12/2011 | Tu |
| D652,236 S | 1/2012 | Walker |
| D652,237 S | 1/2012 | Cittadino |
| D653,067 S | 1/2012 | Cittadino |
| 8,087,625 B2 * | 1/2012 | Chang ............... F16M 11/041 248/205.8 |
| 8,113,361 B2 | 2/2012 | Winter |
| 8,123,181 B2 * | 2/2012 | Choi ................... F16B 47/00 248/205.5 |
| 8,157,111 B2 | 4/2012 | Didehvar |
| D660,064 S | 5/2012 | Webb |
| D660,065 S | 5/2012 | Webb |
| D660,066 S | 5/2012 | Webb |
| 8,185,981 B2 | 5/2012 | Didehvar |
| 8,186,509 B2 | 5/2012 | Samelson |
| D661,529 S | 6/2012 | Cittadino |
| D661,927 S | 6/2012 | Cittadino |
| 8,191,839 B2 * | 6/2012 | Fan ................... F16B 47/006 248/205.5 |
| D664,423 S | 7/2012 | Cittadino |
| D664,424 S | 7/2012 | Cittadino |
| 8,214,938 B2 | 7/2012 | Hanley |
| 8,215,501 B2 | 7/2012 | Trettin |
| D666,012 S | 8/2012 | Walker |
| 8,235,336 B2 | 8/2012 | Lin |
| D667,246 S | 9/2012 | Cittadino |
| D667,295 S | 9/2012 | Harwanko |
| 8,292,253 B2 * | 10/2012 | Zhadanov ............ F16B 47/00 248/205.5 |
| D670,521 S | 11/2012 | Cittadino |
| D670,522 S | 11/2012 | Cittadino |
| D670,944 S | 11/2012 | Cittadino |
| D671,347 S | 11/2012 | Cittadino |
| D671,348 S | 11/2012 | Cittadino |
| D671,395 S | 11/2012 | Harwanko |
| D672,178 S | 12/2012 | Walker |
| D672,990 S | 12/2012 | Lindo |
| D672,991 S | 12/2012 | Cittadino |
| 8,341,775 B2 | 1/2013 | Didehvar |
| 8,347,936 B2 | 1/2013 | Martin |
| D680,421 S | 4/2013 | Martin |
| D681,422 S | 5/2013 | Lindo |
| D681,423 S | 5/2013 | Walker |
| D684,037 S | 6/2013 | Harwanko |
| 8,479,932 B2 | 7/2013 | Carney |
| 8,505,129 B2 | 8/2013 | Parker |
| D691,029 S | 10/2013 | Didehvar |
| D691,030 S | 10/2013 | Lindo |
| D691,031 S | 10/2013 | Harwanko |
| 8,561,667 B1 | 10/2013 | Hanley |
| D693,209 S | 11/2013 | Walker |
| 8,573,416 B2 | 11/2013 | Didehvar |
| 8,584,997 B2 * | 11/2013 | Hajianpour ............ F16B 47/00 248/205.8 |
| D696,573 S | 12/2013 | Didehvar |
| D698,851 S | 2/2014 | Samuels |
| D701,745 S | 4/2014 | Stevens |
| D702,112 S | 4/2014 | Cittadino |
| 8,763,822 B2 | 7/2014 | Didehvar |
| 8,814,114 B2 | 8/2014 | Baines |
| D714,414 S | 9/2014 | Wright, III |
| D714,415 S | 9/2014 | Wright, III |
| 8,827,587 B2 | 9/2014 | Didehvar |
| 8,839,980 B2 | 9/2014 | Baines |
| D714,571 S | 10/2014 | Walker |
| 8,851,305 B2 | 10/2014 | Didehvar |
| 8,851,435 B1 | 10/2014 | Bastien |
| 8,869,999 B2 | 10/2014 | Lindo |
| 8,875,770 B1 | 11/2014 | Martin |
| 8,925,881 B2 * | 1/2015 | Diatzikis ................. B60R 11/02 248/205.5 |
| 8,960,456 B2 | 2/2015 | Didehvar |
| 8,978,228 B2 | 3/2015 | Didehvar |
| 8,979,046 B2 | 3/2015 | Woo |
| D728,044 S | 4/2015 | Boatwright |
| 9,009,878 B2 | 4/2015 | Baines |
| D729,618 S | 5/2015 | Bastien |
| D730,162 S | 5/2015 | Bastien |
| 9,021,627 B2 | 5/2015 | Parker |
| D734,399 S | 7/2015 | Baumann |
| 9,107,495 B2 | 8/2015 | Lindo |
| 9,107,496 B2 | 8/2015 | Lindo |
| 9,107,529 B2 | 8/2015 | Didehvar |
| 9,107,544 B2 | 8/2015 | Cittadino |
| 9,131,795 B2 | 9/2015 | Didehvar |
| D746,667 S | 1/2016 | Vaccaro |
| 9,271,592 B2 | 3/2016 | Didehvar |
| 9,307,838 B1 | 4/2016 | Blavat |
| 9,357,860 B1 | 6/2016 | Klowan |
| 9,388,837 B1 | 7/2016 | Hanley |
| 9,404,526 B2 | 8/2016 | Huang |
| D769,102 S | 10/2016 | Euchner |
| 9,474,421 B2 | 10/2016 | Baines |
| 9,494,184 B1 | 11/2016 | Lee |
| D779,305 S | 2/2017 | Ku |
| 9,578,995 B2 | 2/2017 | Hanley |
| 9,581,292 B2 | 2/2017 | Kremer |
| D782,279 S | 3/2017 | Baker |
| D783,385 S | 4/2017 | Zhu |
| 9,611,884 B1 | 4/2017 | Kuo |
| 9,618,032 B2 * | 4/2017 | Woo ..................... F16B 47/003 |
| 9,624,963 B2 * | 4/2017 | Shi ..................... F16B 47/006 |
| D811,205 S | 2/2018 | Hanley |
| D813,021 S | 3/2018 | Hanley |
| D813,022 S | 3/2018 | Hanley |
| 10,034,587 B1 | 7/2018 | Elliot |
| 10,070,748 B2 | 9/2018 | Hanley |
| 10,092,126 B2 | 10/2018 | Baines |

(56) References Cited

U.S. PATENT DOCUMENTS

| | | | |
|---|---|---|---|
| D837,039 S | 1/2019 | Angus | |
| 10,208,786 B2* | 2/2019 | Tooley | F16B 47/003 |
| 10,253,803 B2* | 4/2019 | Mutch | A47G 19/10 |
| D861,112 S | 9/2019 | Lott | |
| D871,891 S | 1/2020 | Emanuel | |
| D885,165 S | 5/2020 | Frydenger | |
| 10,641,314 B1* | 5/2020 | Fan | F16B 47/006 |
| 10,731,391 B2* | 8/2020 | Lucari | E05B 13/002 |
| D897,722 S | 10/2020 | McGugan | |
| D899,226 S | 10/2020 | Frydenger | |
| D899,895 S | 10/2020 | Moss | |
| D915,639 S | 4/2021 | Zhao | |
| D923,460 S | 6/2021 | McNaughton | |
| 11,215,217 B2 | 1/2022 | Moss | |
| D956,522 S | 7/2022 | Smith | |
| D974,151 S | 1/2023 | Chen | |
| D977,181 S | 1/2023 | Zhao | |
| D977,947 S | 2/2023 | Morris | |
| D979,377 S | 2/2023 | Hu | |
| D979,877 S | 2/2023 | Theissen | |
| 2002/0175250 A1 | 11/2002 | Lian | |
| 2002/0190170 A1* | 12/2002 | Ting | E03C 1/06 248/205.5 |
| 2003/0209509 A1 | 11/2003 | Felsenthal | |
| 2004/0182806 A1 | 9/2004 | Figueroa | |
| 2005/0044673 A1* | 3/2005 | Huang | A47G 1/17 24/303 |
| 2006/0204322 A1 | 9/2006 | Roiser | |
| 2007/0120027 A1* | 5/2007 | Chang | F16M 13/022 248/205.5 |
| 2007/0170134 A1 | 7/2007 | Bishop | |
| 2007/0215766 A1* | 9/2007 | Yen | B60R 11/02 248/205.8 |
| 2007/0278371 A1* | 12/2007 | Wang | F16M 11/10 248/309.3 |
| 2008/0163418 A1 | 7/2008 | Barrese | |
| 2009/0223642 A1 | 9/2009 | Militello | |
| 2009/0223917 A1 | 9/2009 | Grant | |
| 2010/0176253 A1 | 7/2010 | Son | |
| 2010/0206492 A1 | 8/2010 | Shevick | |
| 2010/0252700 A1 | 10/2010 | Wang | |
| 2010/0316438 A1 | 12/2010 | Sohn | |
| 2010/0320341 A1* | 12/2010 | Baumann | F16B 47/006 248/299.1 |
| 2011/0210225 A1* | 9/2011 | Chen | F16B 47/006 248/363 |
| 2012/0001042 A1 | 1/2012 | Zhong | |
| 2012/0005823 A1 | 1/2012 | Baines | |
| 2012/0017366 A1 | 1/2012 | Barrese | |
| 2012/0112023 A1* | 5/2012 | Tollman | F16B 47/006 248/205.8 |
| 2012/0152872 A1 | 6/2012 | Didehvar | |
| 2012/0152873 A1 | 6/2012 | Didehvar | |
| 2012/0152874 A1 | 6/2012 | Didehvar | |
| 2012/0168581 A1* | 7/2012 | Cheng | F16M 11/041 248/278.1 |
| 2012/0211633 A1* | 8/2012 | Zhou | F16M 13/02 248/397 |
| 2012/0241399 A1 | 9/2012 | Trettin | |
| 2012/0284914 A1 | 11/2012 | Bauer | |
| 2013/0045041 A1 | 2/2013 | Sohn | |
| 2013/0112639 A1 | 5/2013 | Baines | |
| 2013/0334156 A1 | 12/2013 | Baines | |
| 2013/0341474 A1 | 12/2013 | Baines | |
| 2014/0084118 A1* | 3/2014 | Tooley | F16B 11/00 248/205.3 |
| 2014/0131298 A1 | 5/2014 | Didehvar | |
| 2014/0166603 A1 | 6/2014 | Baines | |
| 2014/0263123 A1 | 9/2014 | Ford | |
| 2014/0335976 A1 | 11/2014 | Hiller | |
| 2014/0352054 A1* | 12/2014 | Tollasepp | A47J 47/20 4/654 |
| 2014/0374553 A1* | 12/2014 | Park | F16B 47/00 248/205.5 |
| 2015/0108134 A1* | 4/2015 | Fangyuan | B65D 25/22 248/205.8 |
| 2015/0191124 A1* | 7/2015 | Du | F16M 13/022 248/205.5 |
| 2015/0250333 A1* | 9/2015 | Schaefer | A47B 73/008 248/205.8 |
| 2015/0297038 A1 | 10/2015 | Vaccaro | |
| 2016/0097419 A1* | 4/2016 | Huang | F16M 13/022 248/205.7 |
| 2016/0169269 A1* | 6/2016 | Wang | F16M 13/022 248/206.2 |
| 2016/0201714 A1 | 7/2016 | Zhang | |
| 2017/0360261 A1 | 12/2017 | Coratolo | |
| 2018/0098656 A1 | 4/2018 | Baines | |
| 2018/0296018 A1 | 10/2018 | Baines | |
| 2019/0082830 A1* | 3/2019 | Schaefer | A47F 7/28 |
| 2020/0093285 A1* | 3/2020 | Brenner | A47F 3/0486 |
| 2020/0224709 A1 | 7/2020 | Moss | |
| 2020/0232501 A1* | 7/2020 | McClean | A47G 29/087 |
| 2022/0120311 A1 | 4/2022 | Moss | |

OTHER PUBLICATIONS

"Suction Cup Hooks, Pack of 12—Locking System—Extra Strong Vacuum Suction Power—Ideal Kitchen or Bath." More than one year before Feb. 23, 2018, 3 pages.
"Suction Cup Hooks." More than one year before Feb. 23, 2018, 2 pages.
"SUPOW Bathroom Grab Bar, Strong Suction Shower Handle & Bathroom Balance Bar Anti-slipping Suction Cut Support Assist Handle Grip Hand Rail Helping Tool Wall Mount for Elderly & Children." SUPOW, more than one year before Feb. 23, 2018, 4 pages.
Mainstay Product—18-28 in. Basic Adjustable Curtain Rod (distributed by Wal-Mart Stores, Inc.) <https://www.walmart.com/ip/Mainstays-18-28-in-Basic-Adjustable-Curtain-Rod-2-in-Clearance/50015120>, believed to be publicly available for more than one year before Feb. 23, 2018, 8 pages.
Design U.S. Appl. No. 29/721,523, filed Jan. 21, 2020, 13 pages.
Design U.S. Appl. No. 29/750,985, filed Sep. 17, 2020, 35 pages.
U.S. Appl. No. 16/831,478, filed Mar. 26, 2020, 18 pages.
HASKO accessories Suction Cup, Amazon, Aug. 24, 2020, https://www.amazon.com/HASKO-accessories-Stainless-Dispenser-Bathroom/dp/B08GL2BDGL (Year: 2020).
Powerful Vacuum Suction Cup Hook, Amazon, Aug. 3, 2016, https://www.amazon.com/HASKO-accessories-Powerful-Organizer-Stainless/dp/B01 J MXKX5M (Year: 2016).

* cited by examiner

US 12,031,565 B2

SUCTION MOUNT AND BRACKETS AND ACCESSORIES THEREFOR

CROSS-REFERENCE TO RELATED APPLICATION

This application claims the benefit of U.S. Provisional Application No. 62/959,424, filed Jan. 10, 2020, which is hereby incorporated by reference.

FIELD

This disclosure relates to suction cup mounts and, more particularly, to suction cup mounts affixed with a threaded operation and brackets and accessories for mounting to the suction cup mounts.

BACKGROUND

Suction cup mounts come in many shapes and sizes. There also are different methods for actuating suction mounts. For example, suction mounts using a vacuum pump include an air pump that must be manually pressed by the user to attach to a surface. The air pump makes vacuum pump suction mounts relatively bulky and more difficult to attach to surfaces.

Another method to attach suction cup mounts is a lever activated system where the lever or switch pulls the center of the suction cup upward, creating the necessary vacuum between the surface and the suction cup. Lever activated suction mounts require operating space directly above and around the mount in order to operate the lever. Due to the location of the lever or switch, attaching an accessory directly above or around the mount is generally not realistic.

A further method includes a suction cup mount activated using a threaded connection with the suction cup. In a common form, there is a threaded bolt, a cover plate and a threaded nut. The nut is tightened to pull the center of the suction cup upward and locks accessories in between the suction cup and nut. While this style of suction mount can be very compact, there often are many pieces involved and a very limited number of accessories can be attached to it. Indeed, many times the mount is dedicated to a specific accessory.

Thus, there is a need for a suction mount that easily creates enhanced suction, has a relatively compact design and supports different accessories.

DETAILED DESCRIPTION

Figure 1:
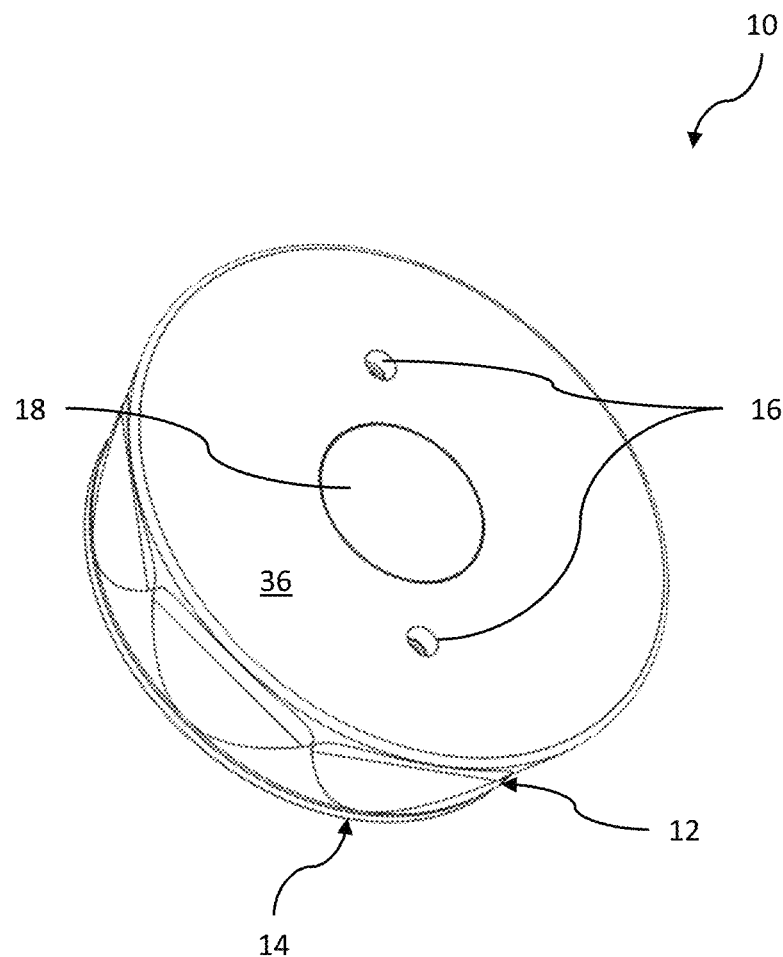
FIG. 1 is a perspective view of a suction mount.

With reference to FIG. 1, there is illustrated a suction mount 10 having a mount body 12 and a suction cup assembly 14. The mount body 12 and the suction cup assembly 14 are mechanically interconnected by a threaded post 30. The mount body 12 is easily turned to increase the suction force of the suction cup assembly 14 and to maintain the suction cup assembly in place. The mount body 12 includes a pair of mounting holes 16 used to attach accessories and a universal mounting bracket, as described further below. The mount body 12 also can include a magnet 18 used to attach magnetic objects. As seen, the suction mount 10 has a compact body that can be used to mount a variety of accessories. It also can be easily scaled between a relatively large size for large accessories to a small, compact and slim size for small accessories. Regardless of the size, the mount body 12 has few moving parts and can provide a low center of gravity.

Figure 2:
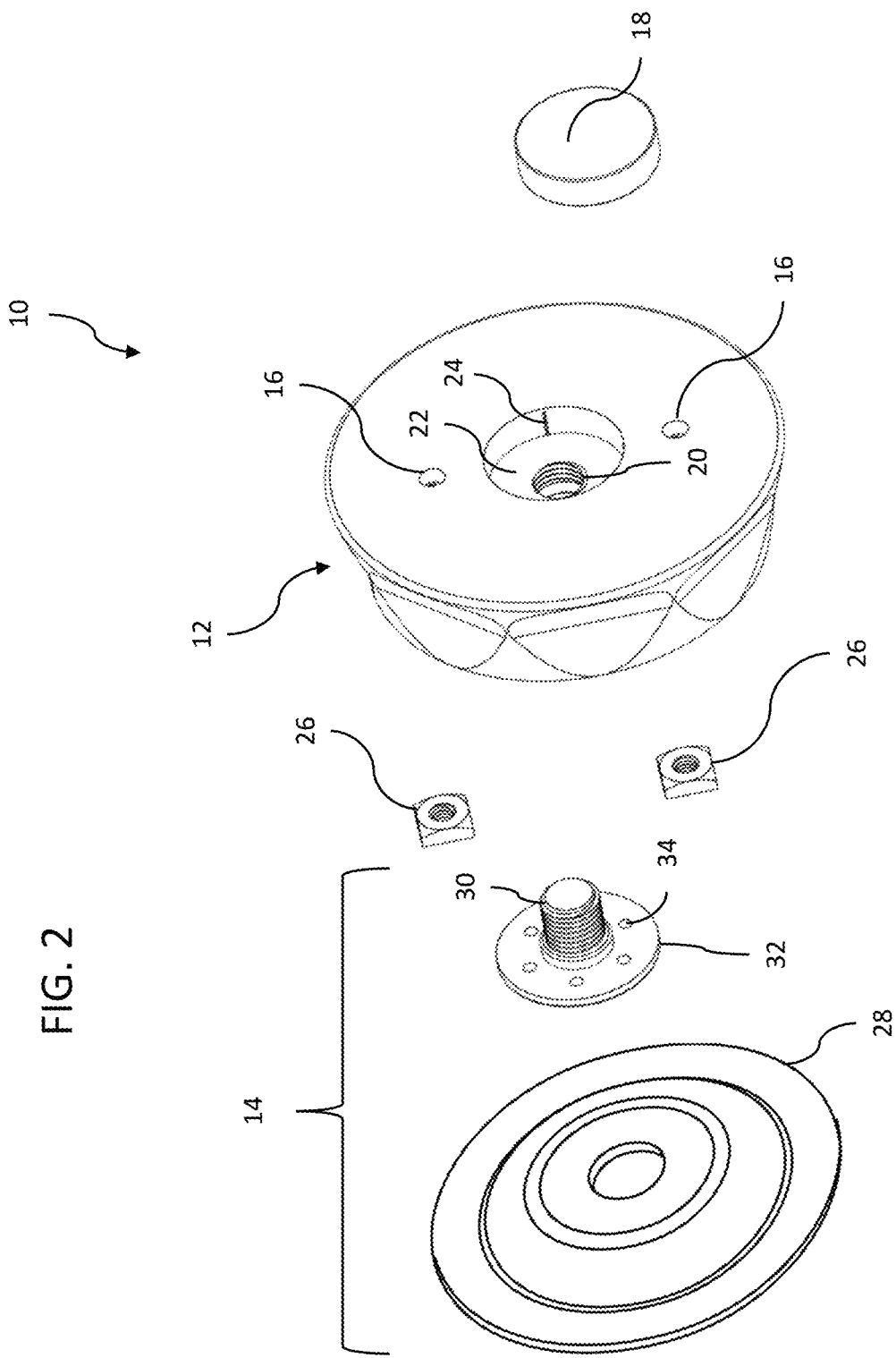
FIG. 2 is an exploded view of the suction mount of FIG. 1.

As shown in FIG. 2, the suction mount 10 includes a centrally located threaded hole 20 that cooperates with the suction cup 14. Overlying and centered on the threaded hole 20 is a recess 22 for the magnet 18. The recess 22 includes small longitudinally extending ribs 24 to help frictionally engage the magnet 18 to maintain the magnet 18 in the recess 22 with a friction fit. The magnet 18 also may be secured in the recess 22 with an adhesive. A pair of nuts 26 are mounted to an inside of the mount body 12 at the accessory mount holes 16 to cooperate with screws of the desired bracket or accessory. The suction cup assembly 14 includes a suction cup 28 and the threaded post 30 with a base 32. The base 32 is affixed to the suction cup 28 in any manner, preferably, however, by overmolding. The base 32 includes holes 34 that enable material of the suction cup 28 to flow into during the molding process to secure the suction cup 28 to the base 32 so that the base 32 is not able to rotate relative to the suction cup 28.

Figure 3:
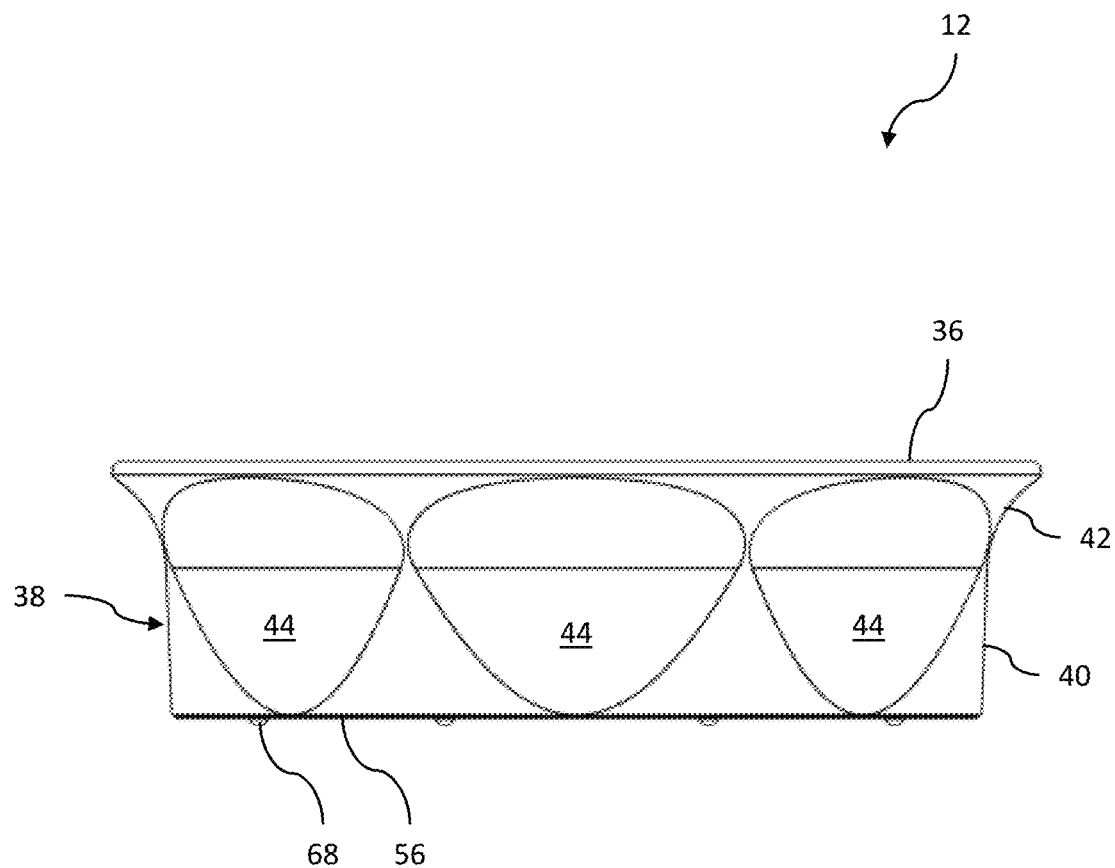
FIG. 3 is a side elevation view of the mount body of the suction mount of FIG. 1.
Figure 4:
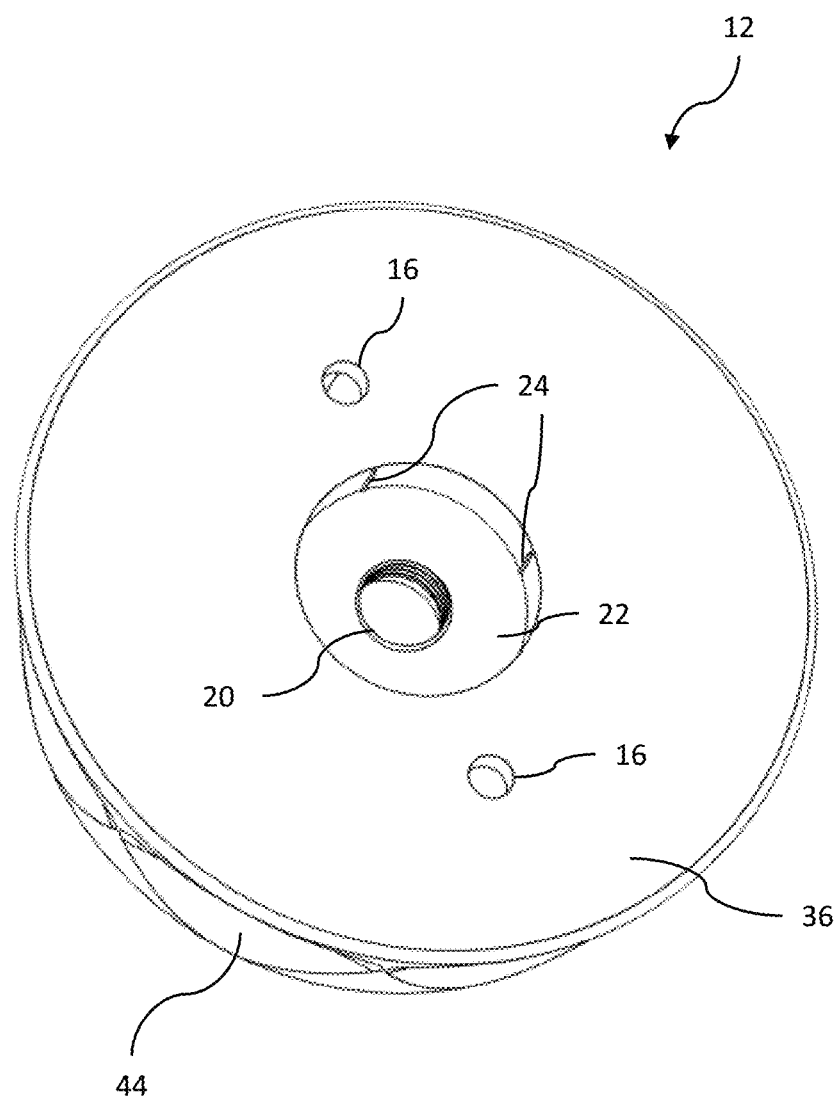
FIG. 4 is a top perspective view of the mount body of the suction mount of FIG. 1.
Figure 5A:
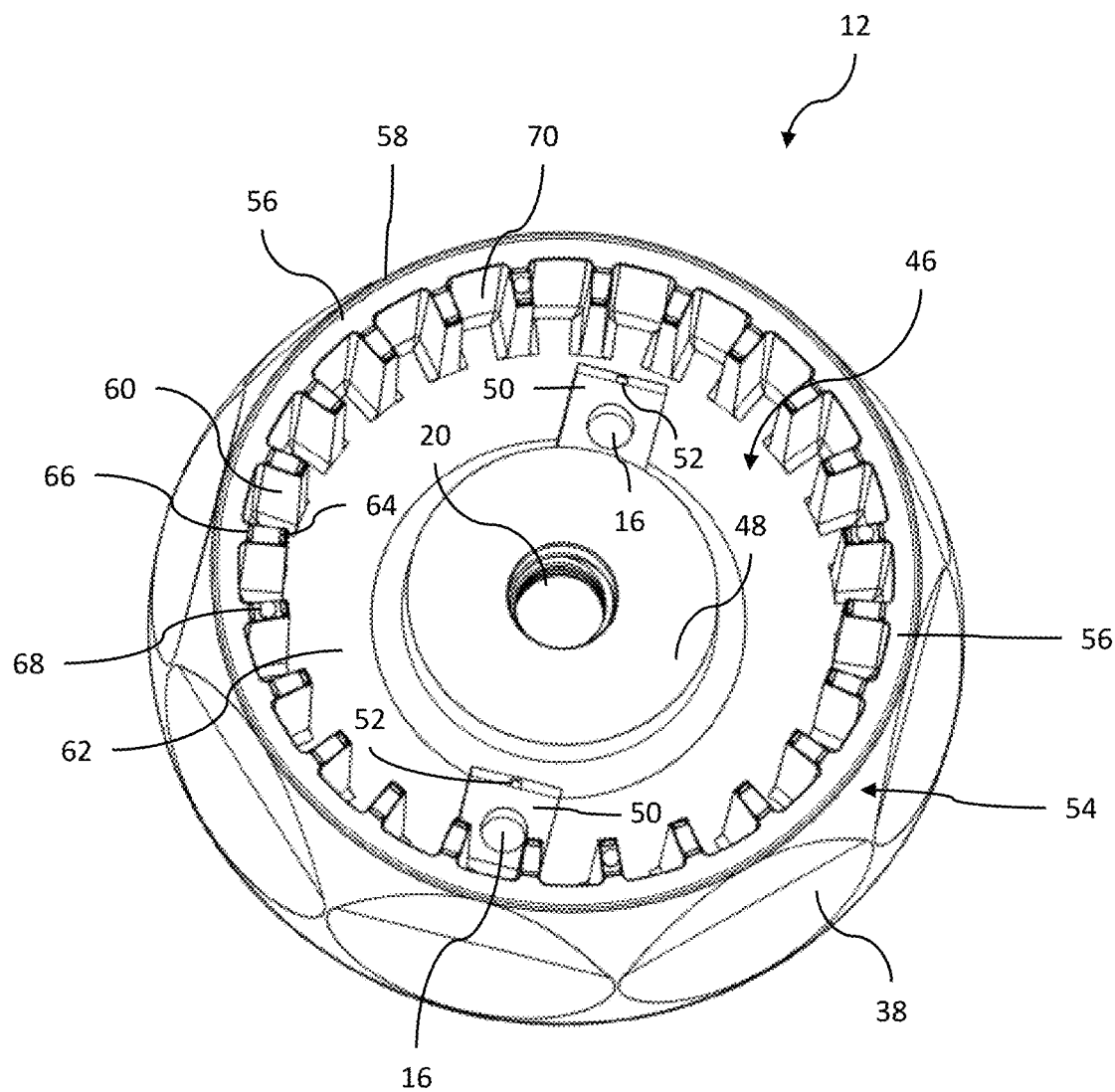
FIG. 5A is a bottom perspective view of the mount body of the suction mount of FIG. 1.

With reference to FIGS. 3-5, the mount body 12 has an annular puck like configuration with a flat top surface 36. An annular side surface 38 has a generally cylindrical portion 40 and outward curved portion 42 adjacent the top surface 36. The side surface 38 includes concave recesses 44. The outward curved portion 42 increases the size of the top surface 36 and coupled with the recesses 44 provides enhanced gripping for a user to turn the mount body 12 during mounting of the suction mount 10 to a surface.

The mount body 12 defines a generally hollow region 46 open at its underside. A boss 48 is centrally located in the hollow region 46 and defines at least in part the threaded hole 20. The mount body 12 defines two pockets 50 located diametrically opposite one another about the boss 48. Each pocket 50 is sized to receive one of the complementary sized nuts 26 in a manner that retains the nut 26 with a friction fit. The nuts 26 align with the accessory mount holes 16. Each pocket 50 may include ribs 52 to further enhance the friction fit between the nut 26 and the pocket 50. The nuts 26 may be overmolded into the pockets 50.

An annular wall 54 surrounds the hollow region 46. The annular wall 54 includes the outer annular side surface 38 and an annular end surface 56. The annular end surface 56 includes an annular rib 58 extending from its outer circumference. A series of longitudinal ribs 60 extend radially inward from the annular wall 54 and from a base 62 of the hollow region 46. A terminal end of each rib 60 includes an inner rib 64 and an outer rib 66. The terminal end of four of the longitudinal ribs 60 include a pad 68. The pads 68 can be located on ribs 90 degrees apart and extend further than the ribs 60, 64, 66 (FIG. 3). The annular rib 58, inner and outer ribs 64, 66 and the pads 68 are designed to engage a perimeter area of the suction cup 28 to control friction during mounting and to hold the suction cup 28 against a mounting surface while suction is being generated by the mount body 12 pulling a center area of the suction cup 28 away from a mounting surface with the threaded post 30. These features will embed into the material of the suction cup 28 during the mounting operation. The annular rib 58, inner and outer ribs 64, 66 and pads 68 may be selected and positioned depending on the friction generated and the holding needs of a particular suction mount. For instance, the annular rib 58 may be discontinuous, the inner and outer ribs 64, 66 may be not be present on all of the longitudinal ribs 60 or may be only the inner or outer ribs 64, 66 are employed. The pads 68 could be added to additional longitudinal ribs or reduced in number or even eliminated. Also, the number of longitudinal ribs 60 could be increased or reduced. One benefit of the longitudinal ribs 60 is to reduce material in the mount body 12 and enable the inner and outer ribs 64, 66 to be intermittent. A pocket 70 is created between adjacent longitudinal ribs 60.

Figure 5B:
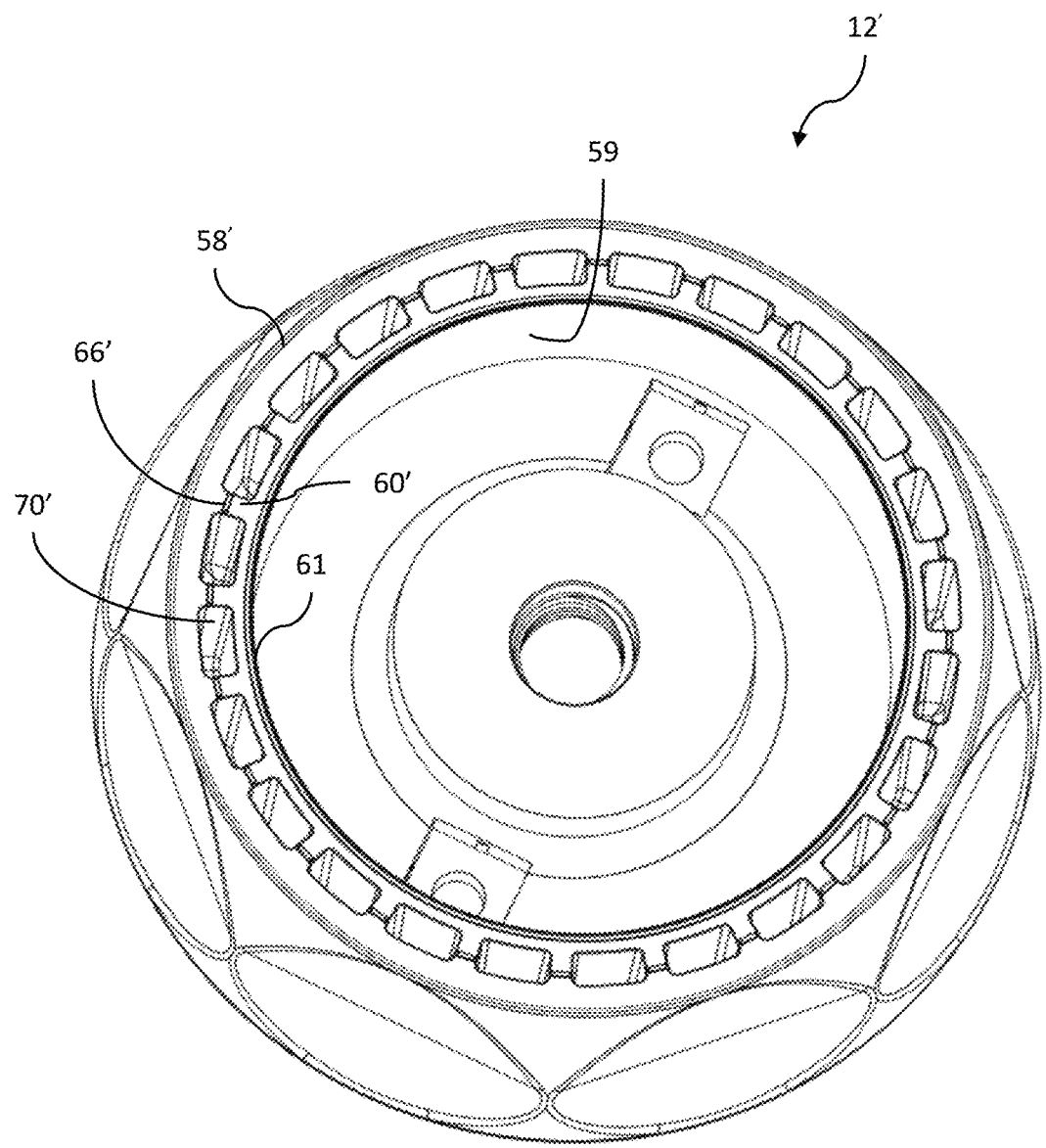
FIG. 5B is a bottom perspective view of another mount body.
Figure 5C:
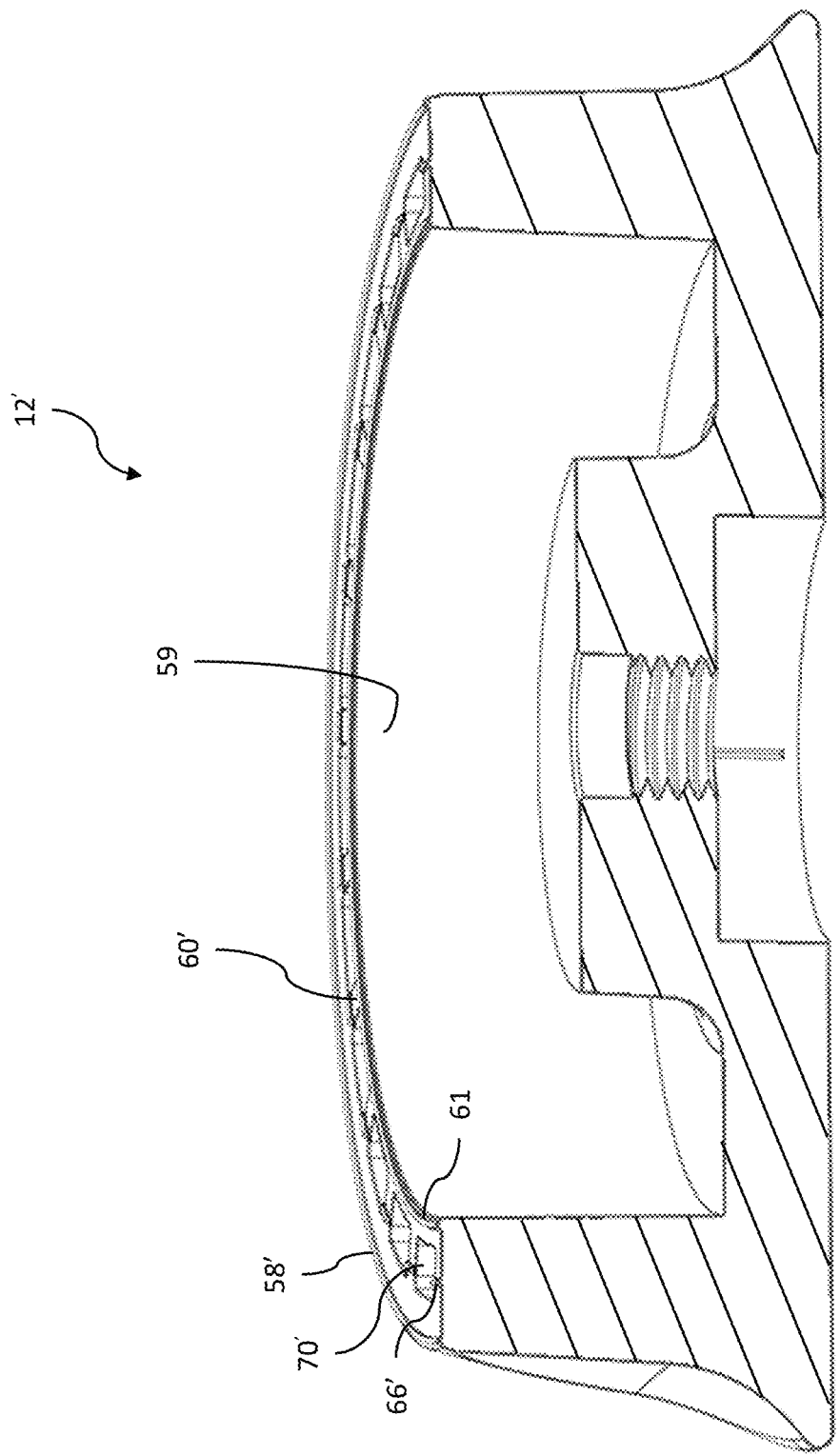
FIG. 5C is a cross-section view of the mount body of FIG. 5B.

With reference to FIGS. 5B and 5C, there is illustrated an alternate embodiment of a body mount 12'. The body mount 12' is almost identical to the body mount 12 (common elements will be denoted with the same reference numbers along with an apostrophe) with the primary difference being an annular wall 59 connecting the longitudinal ribs 60'. Another difference is that a terminal end of the annular wall 59 includes an annular rib 61 projecting axially away from the wall 59. The rib 61 replaces the inner ribs 64 of the body mount 12 and provides more friction on the material of suction cup 28 because it is continuous. The wall 59 also closes the inner side of the pockets 70'. Unlike the body mount 12, none of the longitudinal ribs 60' of the body mount 12' include a pad 68. As with the body mount 12, the ribs 58', 61, and 66' will embed into the material of the suction cup 28 during the mounting operation. The ribs may be selected and positioned depending on the friction generated and the holding needs of a particular suction mount as explained further above for the body mount 12.

Figure 6:
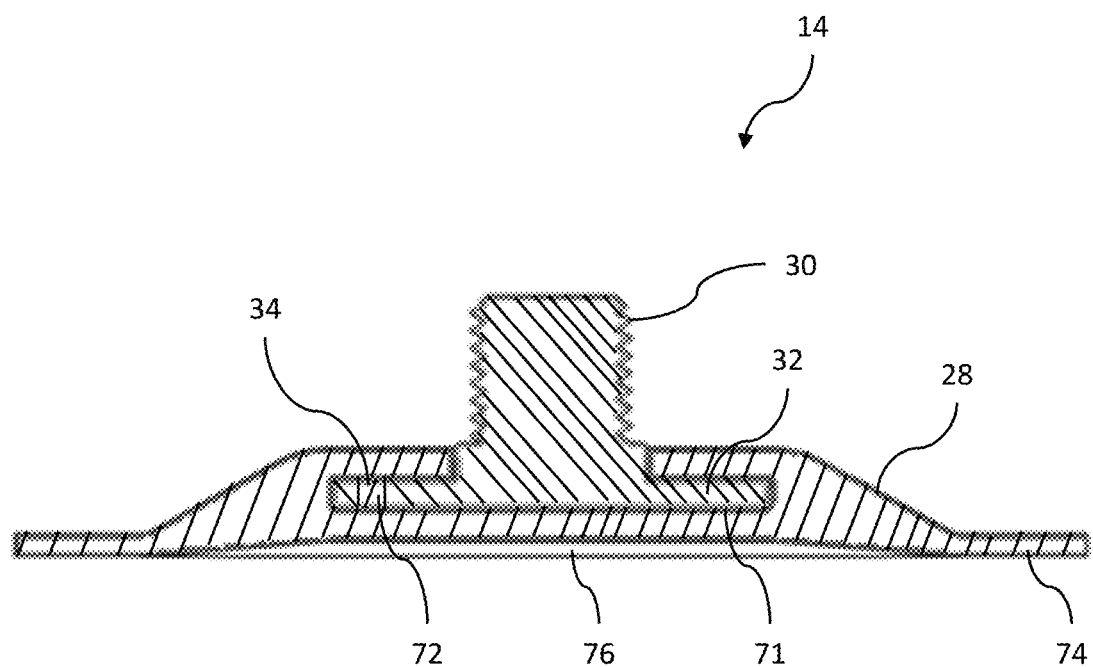
FIG. 6 is a cross-section view of a suction cup assembly of the suction mount of FIG. 1.

As shown in FIG. 6, the suction assembly 14 includes the suction cup 28, the threaded post 30 and the base 32. As discussed above, the base 32 is positioned in a cavity 71 of the suction cup 28. The base 32 includes holes 34 through which material 72 of the suction cup 28 flows into during the molding process so that the suction cup 28 cannot rotate relative to the base 32. The suction cup 28 includes a perimeter region 74 surrounding a centrally positioned concave region 76.

To install the suction mount 10, the mount body 12 and the suction cup assembly 14 may be separated by rotating the mount body 12 counter-clockwise relative to the suction cup assembly 14 to unthread the two from one another. Then, the suction cup assembly 14 may be placed against a mounting surface, and the threaded post 30 may be pushed toward the mounting surface to evacuate most, if not all, of the air from the concave region 76. Next, the mount body 12 is threaded clockwise onto the threaded post 30 and turned until the pads 68 first engage the perimeter region 74 of the suction cup 28. The pads 68 maintain the suction cup 28 in place initially. The user continues to turn the mount body 12 clockwise to engage the ribs 60, 64, 66 with the perimeter region 74 of the suction cup 28 to embed the ribs in the perimeter region 74 to further resist movement of the perimeter region 74 along the mounting surface as the concave region 76 of the suction cup 28 is drawn away from the mounting surface to increase the vacuum force in the concave region 76. Eventually, the entire annular end surface 56 of the mount body 12 engages the perimeter region 74 of the suction cup 28 with the pads 68 embed deeper into the perimeter region 74 of the suction cup 28 than the ribs 60, 64, 66. The pull force of the threaded post (30) and the pressure asserted by the annular end surface (56) work against each other so that when combined like they are in the suction mount 10 they greatly increase the suction force of the surface mount 10. In one embodiment, it takes about 3-6 clockwise turns of the mount body 12 to mount the suction mount 10 to a mounting surface.

Once enough suction force is generated, the suction mount 10 is firmly affixed to the mounting surface. The suction mount 10 can be removed from the mounting surface by reversing this operation.

Figure 7:
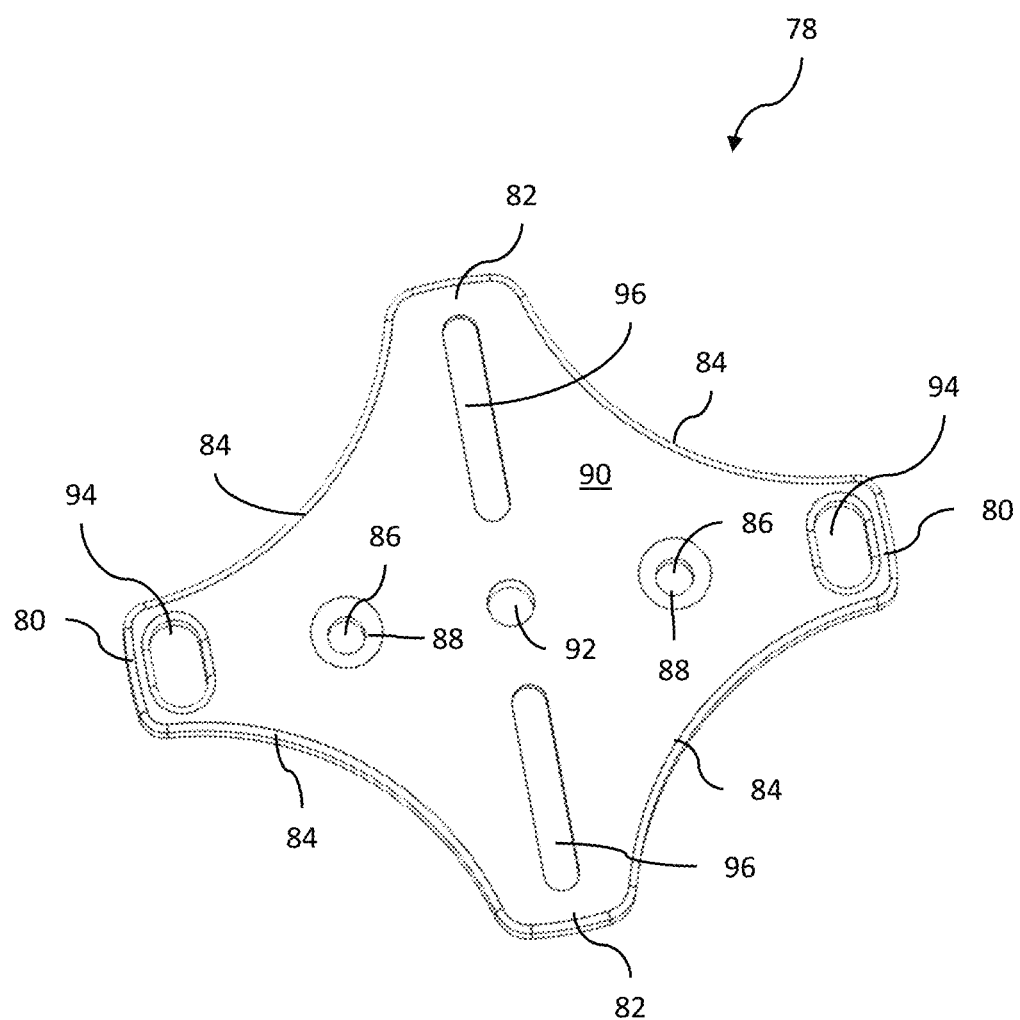
FIG. 7 is a top perspective view of a bracket used to mount accessories to the suction mount of FIG. 1.
Figure 8:
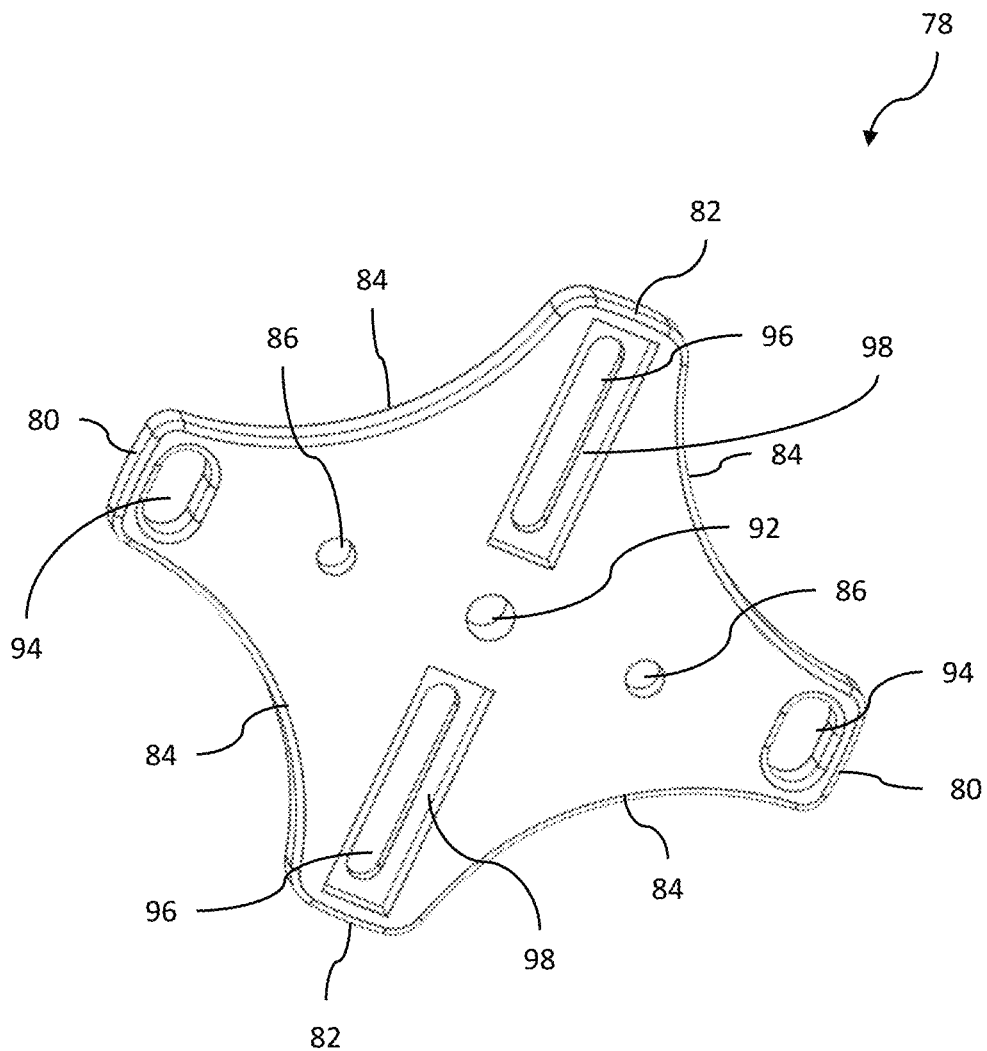
FIG. 8 is a bottom perspective view of the bracket of FIG. 7.

Turning to FIGS. 7 and 8, there is illustrated a bracket 78 designed to mount various accessories to the body mount 12. The bracket 78 has a generally diamond like configuration with four protrusions 80, 82 separated by arcuate edges 84. The bracket 78 contains two mounting holes 86 that are spaced symmetrically to align with the accessory mount holes 16 of the mount body 12. The mounting holes 86 include an annular countersunk conical region 88 so that heads of mounting screws can be flush with a top surface 90 of the bracket 78.

In between the mounting holes 86, there is located a hole 92 used to mount accessories. Two of the protrusions 80 define oval slots 94 also for mounting accessories. The oval holes 94 provide flexibility in mounting accessories. The other two protrusions 82 include radial extending elongated slots 96 for mounting accessories. The bracket 78 defines pockets 98 running along the backside of the elongated slots 96 for receiving a nut to cooperate with a screw of an accessory. The nut may be moved in the pocket 98 radially to the desired position. The nut may have a slight friction fit with the pocket 98. In one form, the elongated slots can have length that provides a mounting range between the nuts of at least 27.5 millimeter to 78.7 millimeters. The bracket can be used to mount many different accessories, including a boat cleat and a paddle holder just to name a couple.

Figure 9:
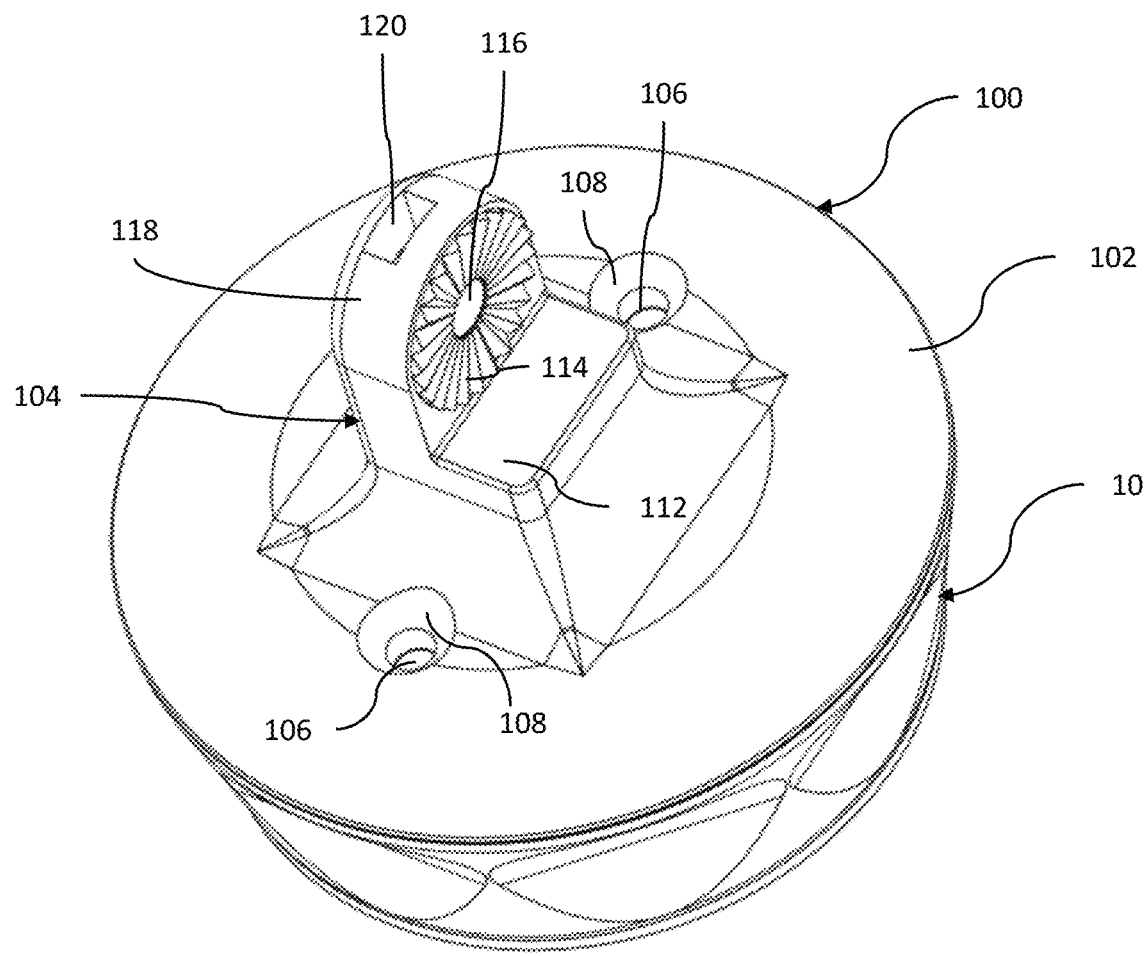
FIG. 9 is top perspective view of an adjustable angle mount attached to the suction mount of FIG. 1.
Figure 10:
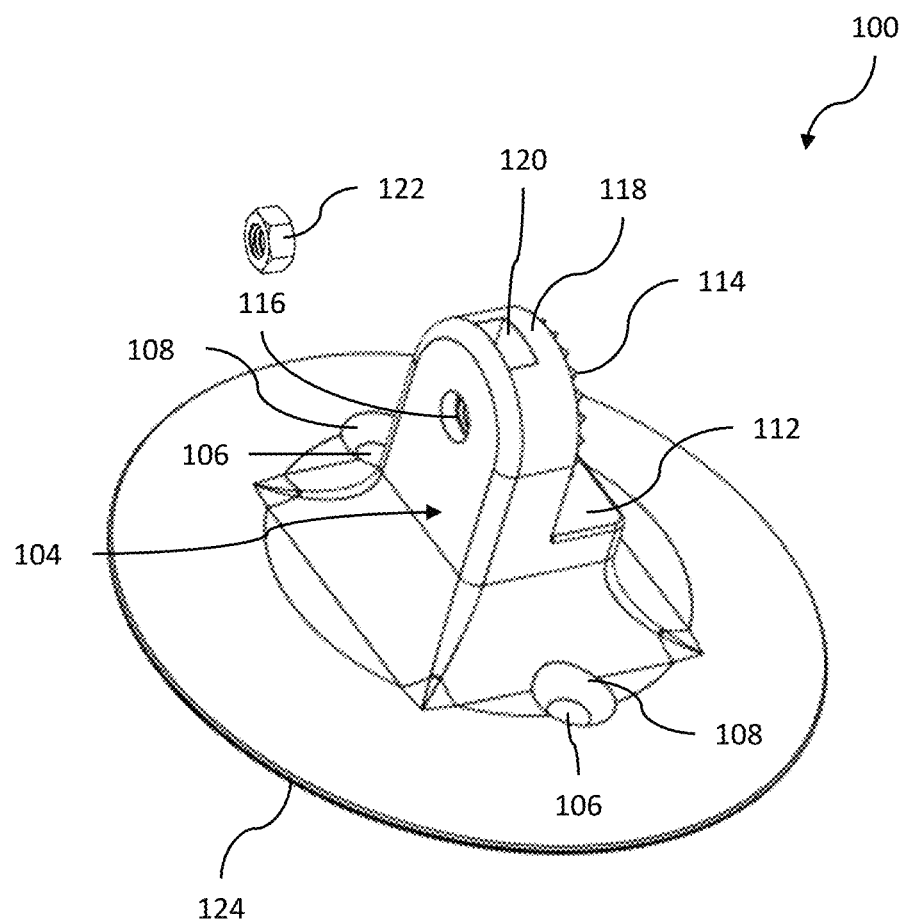
FIG. 10 is an exploded view of the adjustable angle mount of FIG. 9.

With reference to FIGS. 9 and 10, there is illustrated an adjustable angle mount 100 attached to the suction mount 10. The adjustable angle mount 100 is used to mount accessories in a manner where the angle can be varied between the accessory and the suction mount 10. The adjustable angle mount 100 includes a base 102 and an arm 104. The base 102 is shown as circular with an outer perimeter aligning with an outer perimeter of the mount body 12. The base 102 defines a pair of mounting holes 106 that are positioned to align with the accessory mount holes 16 of the mount body 12. The mounting holes 106 can have an annular countersunk portion 108 so that a head of a mounting screw can be flush with a top surface 110 of the base 102.

The arm 104 extends perpendicularly away from the top surface 110 of the base 102. The arm 104 includes a stepped end configuration with a flat landing 112 and a serrated face 114 perpendicular to the landing 112. At the center of the serrated face 114, there is a mounting hole 116. The serrations of the serrated face 114 extend radially from the mounting hole 116 and cooperate with serrations on an accessory to secure an angle for the accessory relative to the arm 104. A terminal end 118 of the arm 104 includes a pocket 120 designed to hold a nut 122 to be used with a fastener, such as a thumb screw, for fastening an accessory to the arm 104. The pocket 120 can be sized to receive the nut 122 with a friction fit so it remains in the pocket 120 after being inserted. A back surface 124 of the base 102 is flat to mate flush with the flat top surface 36 of the mount body 12.

Figure 11:
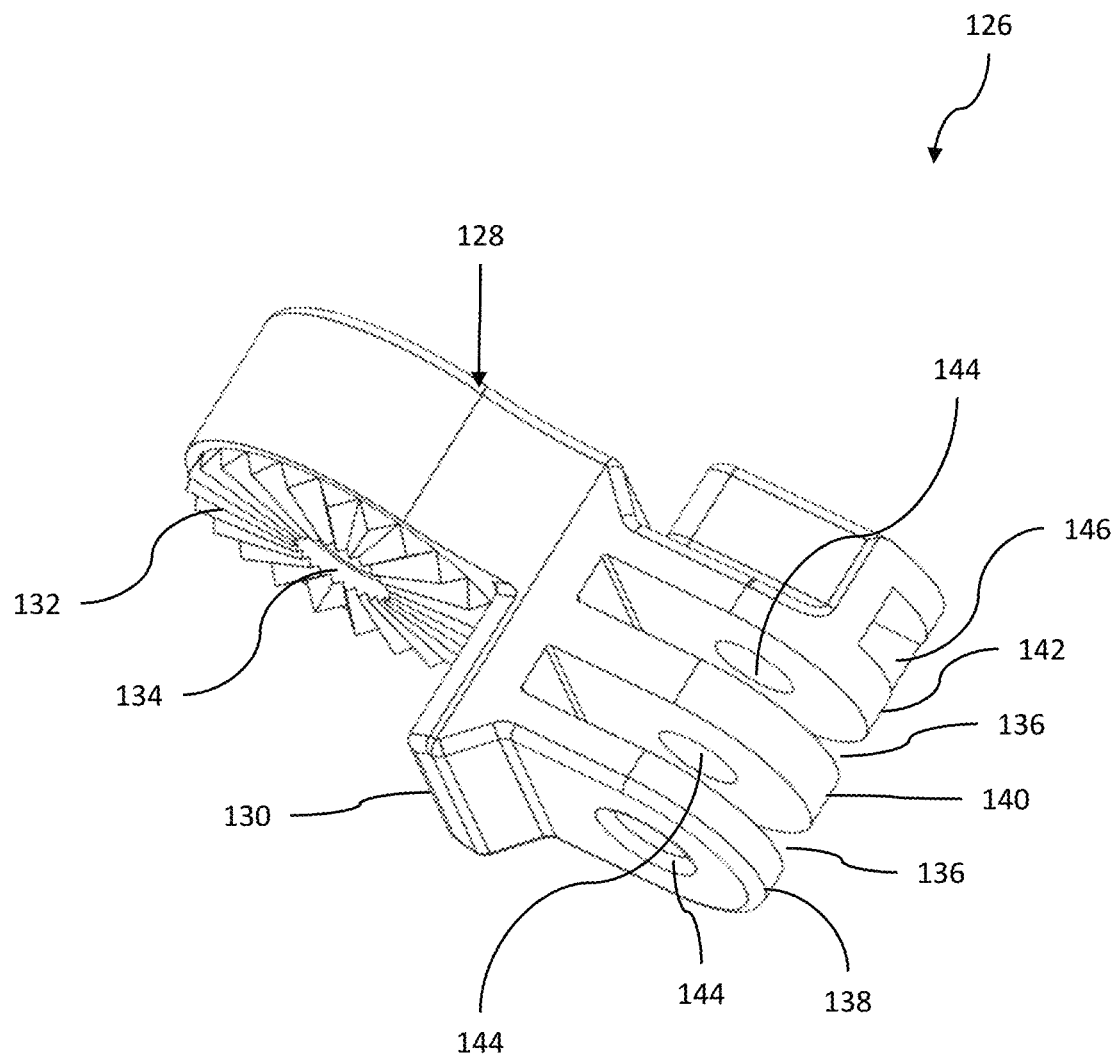
FIG. 11 is a perspective view of a double slotted accessory bracket.

In FIG. 11, there is illustrated a double slotted accessory bracket 126 that can be used to attach accessories having a similar style of complementary bracket, such as products from GoPro, Inc. The bracket 126 includes a stepped arm 128 including an arcuate landing 130 and a serrated face 132 perpendicular to the landing 130. The arm 128 defines an attachment hole 134 and serrations of the serrated face 132 extend radially from the attachment hole 134. The other end of the arm 128 includes a pair of slots 136 defined by three walls 138, 140, 142. The walls 138, 140, 142 each define a hole 144 that all align with one another. Outer wall 142 defines a pocket 146 that can receive a threaded nut (like nut 122) in a friction fit fashion. The bracket 126 can cooperate with the adjustable angle mount 100 to attach the bracket 126 to the mount body 12 of the suction mount 10. The serrated faces 114, 132 cooperate with one another, and the holes 116, 134 align so that a thumb screw can secure the two brackets 100, 126 together at the desired angle. The thumb screw can be loosened to allow the serrations of the serrated faces 114, 132 to cam over one another to change the relative angle. If the terminal end 118 of the bracket 100 is arcuate, then it can easily move in the arcuate landing 130 of the bracket 126.

Figure 12:
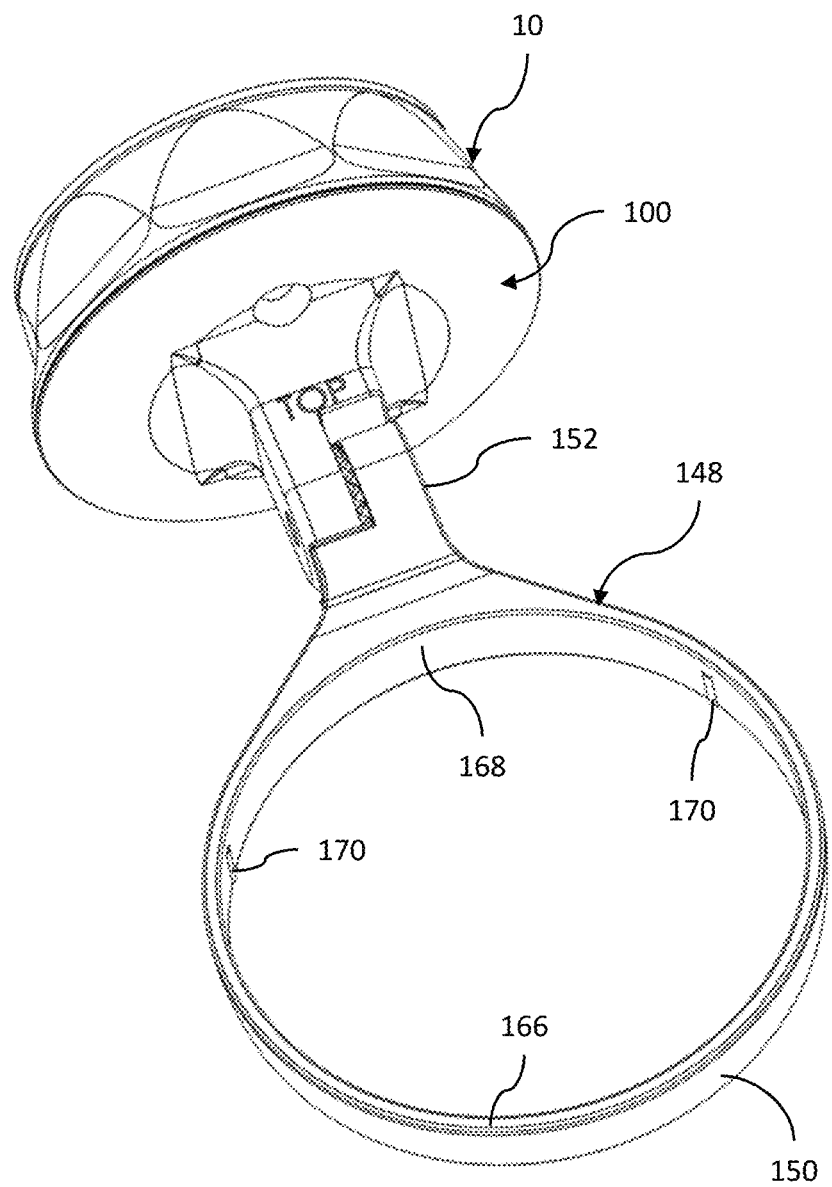
FIG. 12 is a perspective view of a single cup holder accessory attached to the suction mount of FIG. 1 using the adjustable angle mount of FIG. 10.
Figure 13:
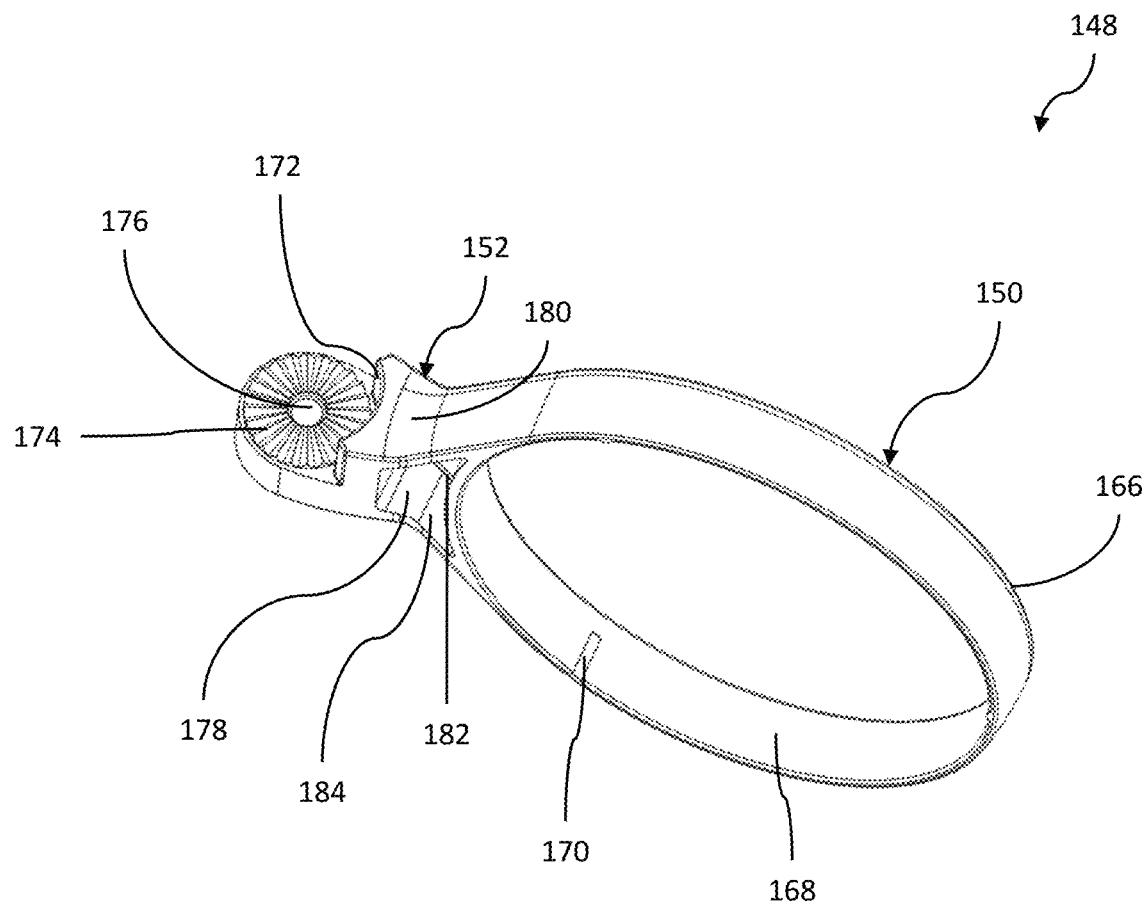
FIG. 13 is a perspective view of the single cup holder accessory of FIG. 12.
Figure 14:
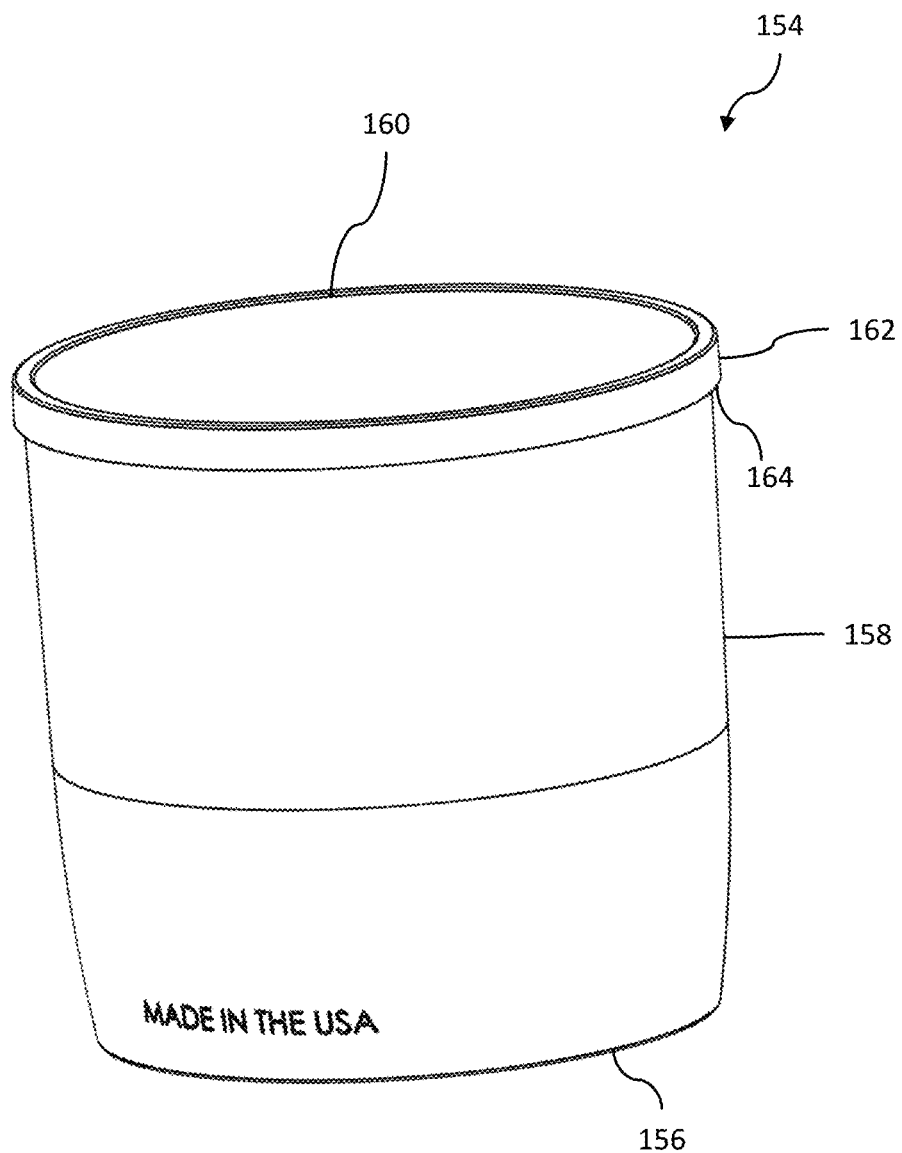
FIG. 14 is a perspective view of a cup accessory.
Figure 15:
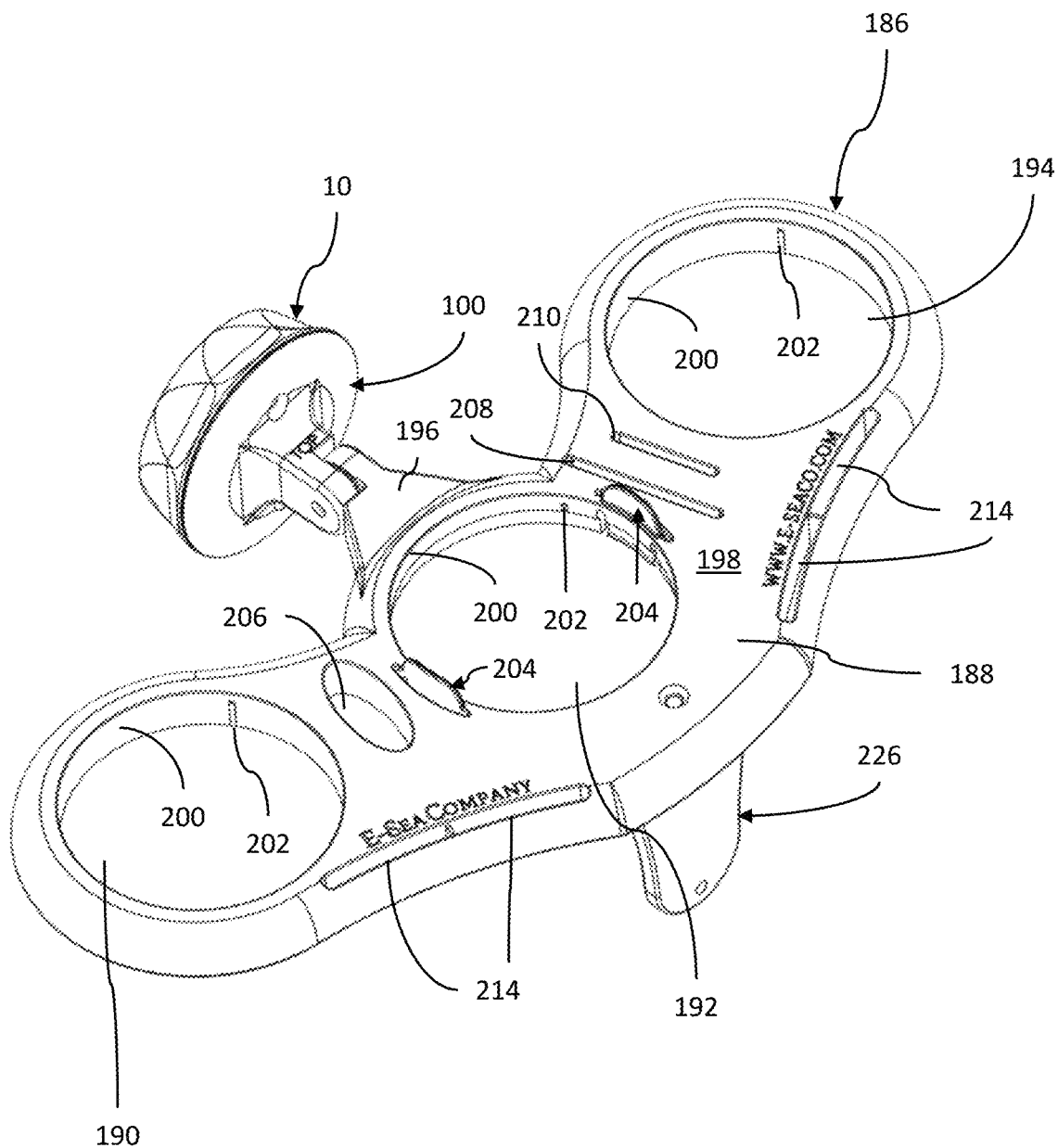
FIG. 15 is a perspective view of a multi-cup accessory mounted to the suction cup of FIG. 1 using the adjustable mount of FIG. 9.
Figure 16:
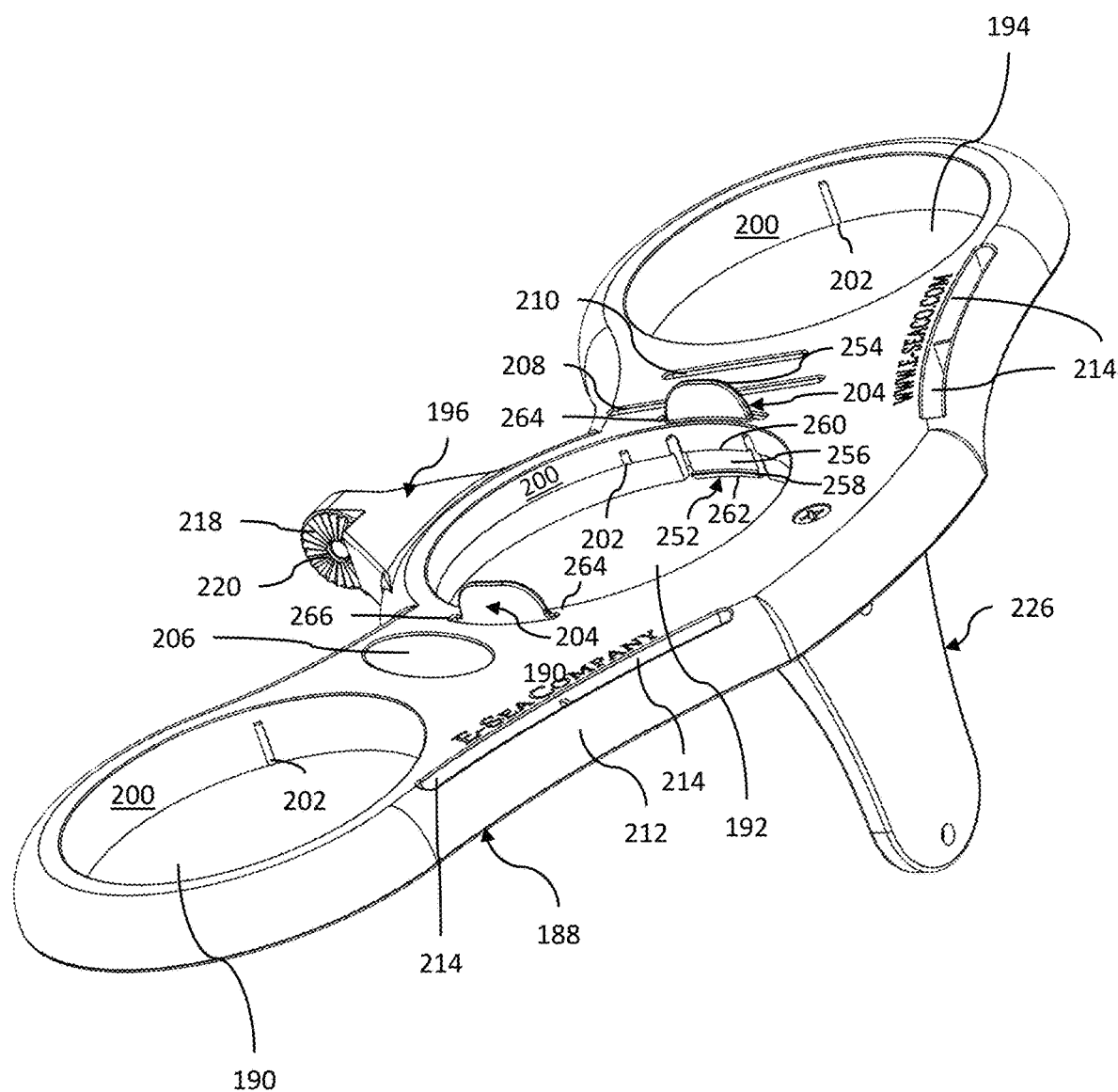
FIG. 16 is a perspective view of the multi-cup accessory of FIG. 15.
Figure 17:
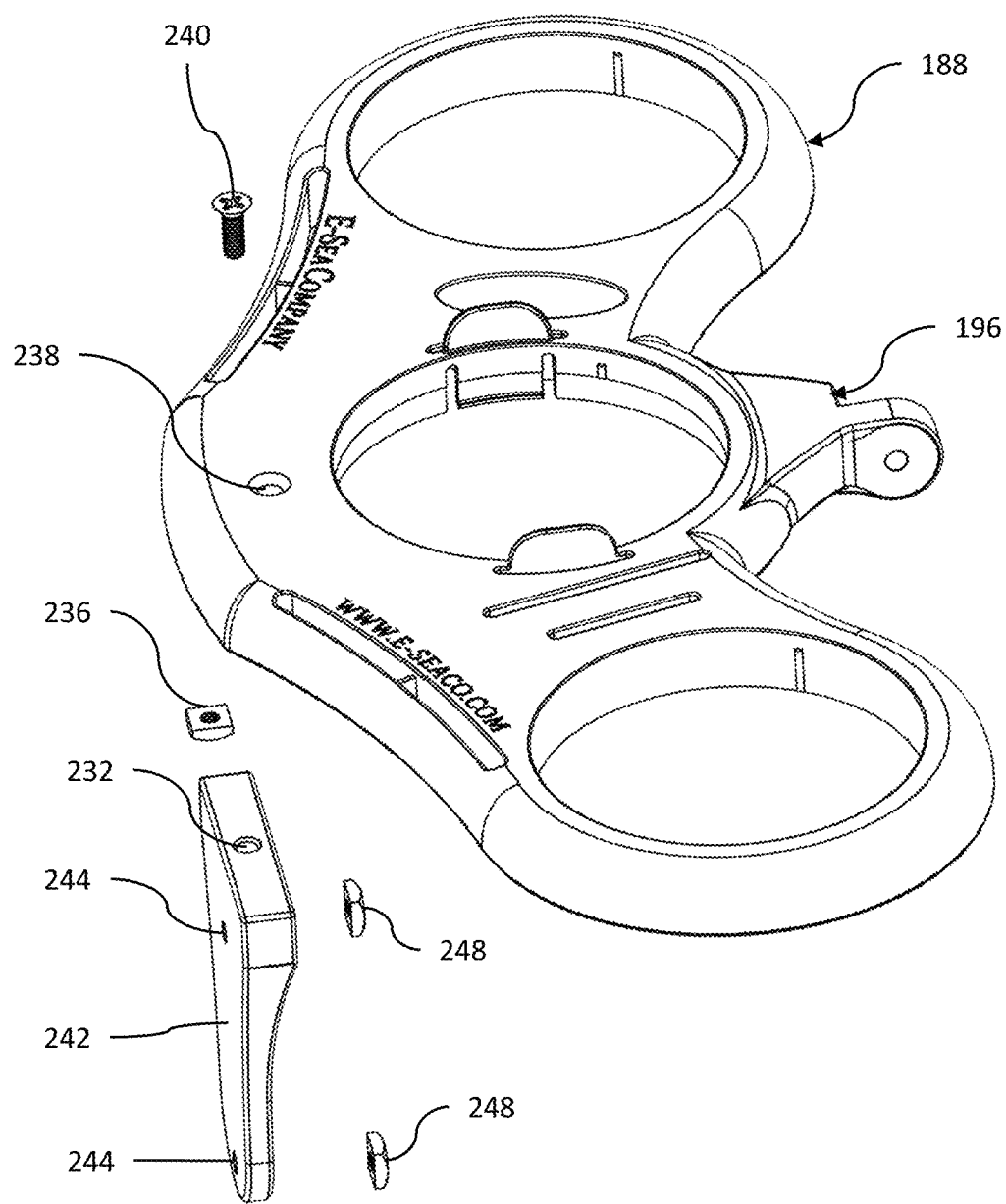
FIG. 17 is an exploded view of the multi-cup accessory of FIG. 16.
Figure 18:
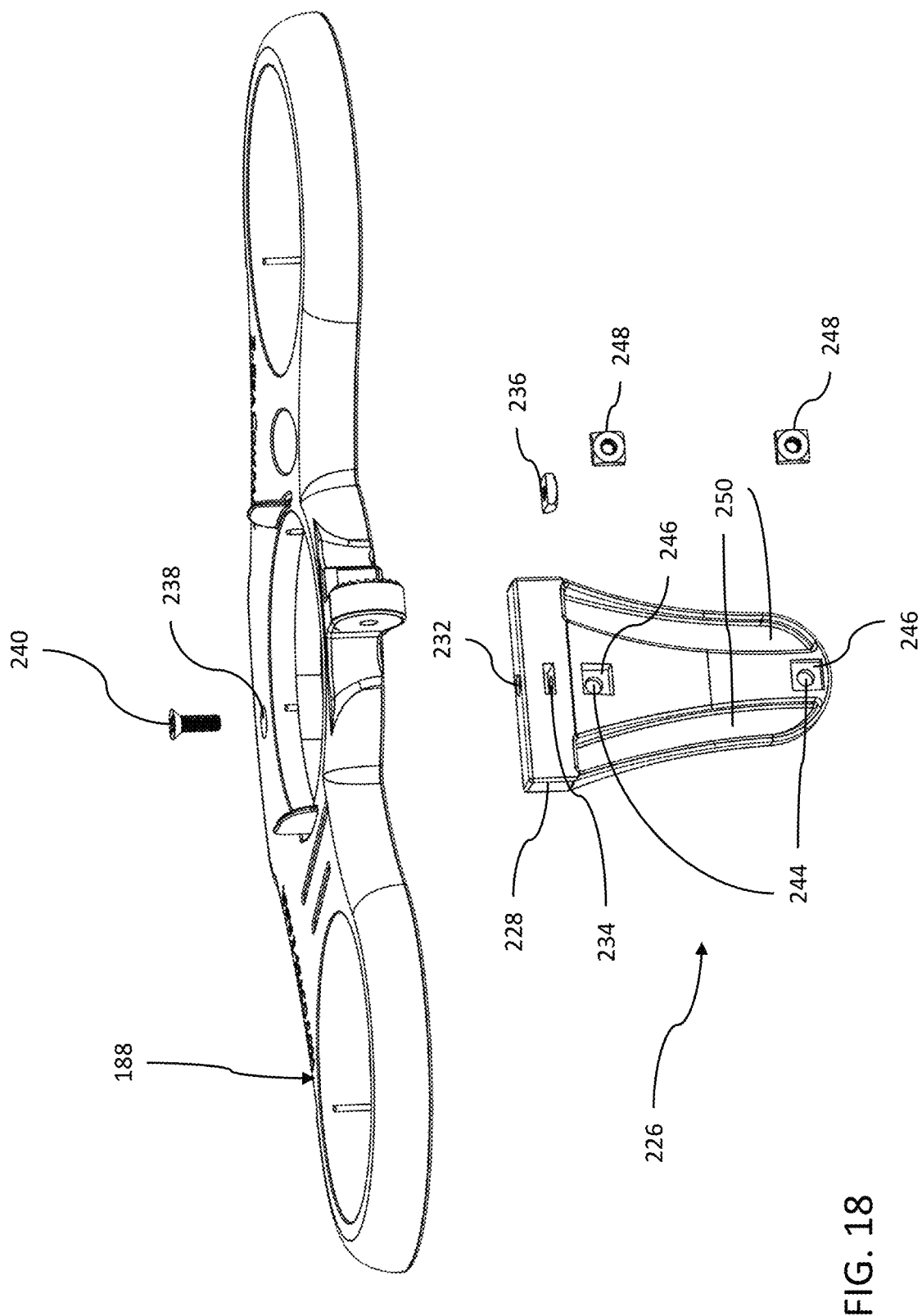
FIG. 18 is another exploded view of the multi-cup accessory of FIG. 16.
Figure 19:
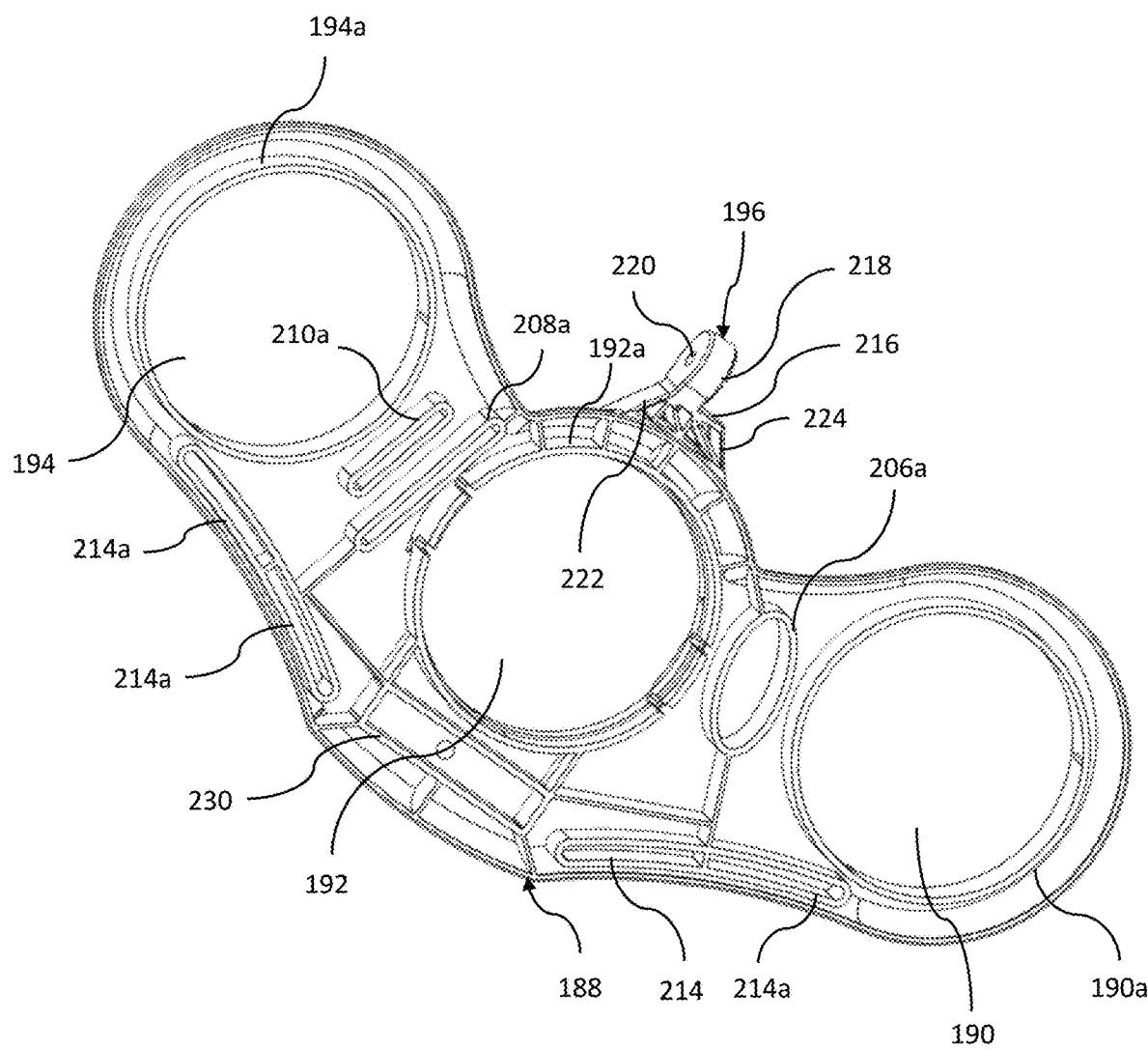
FIG. 19 is a bottom perspective view of the multi-cup accessory of FIG. 16.
Figure 20:
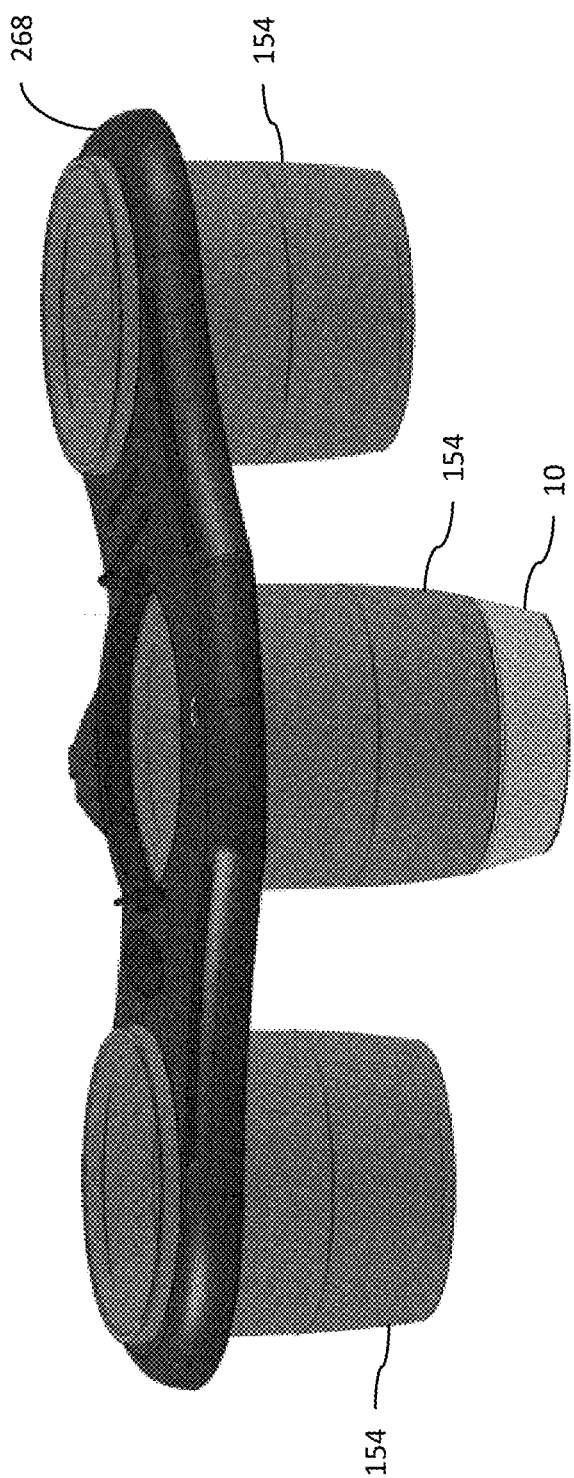
FIG. 20 is a perspective view of the multi-cup accessory using the cup accessory of FIG. 14 to mount directly to the suction mount of FIG. 1.
Figure 21:
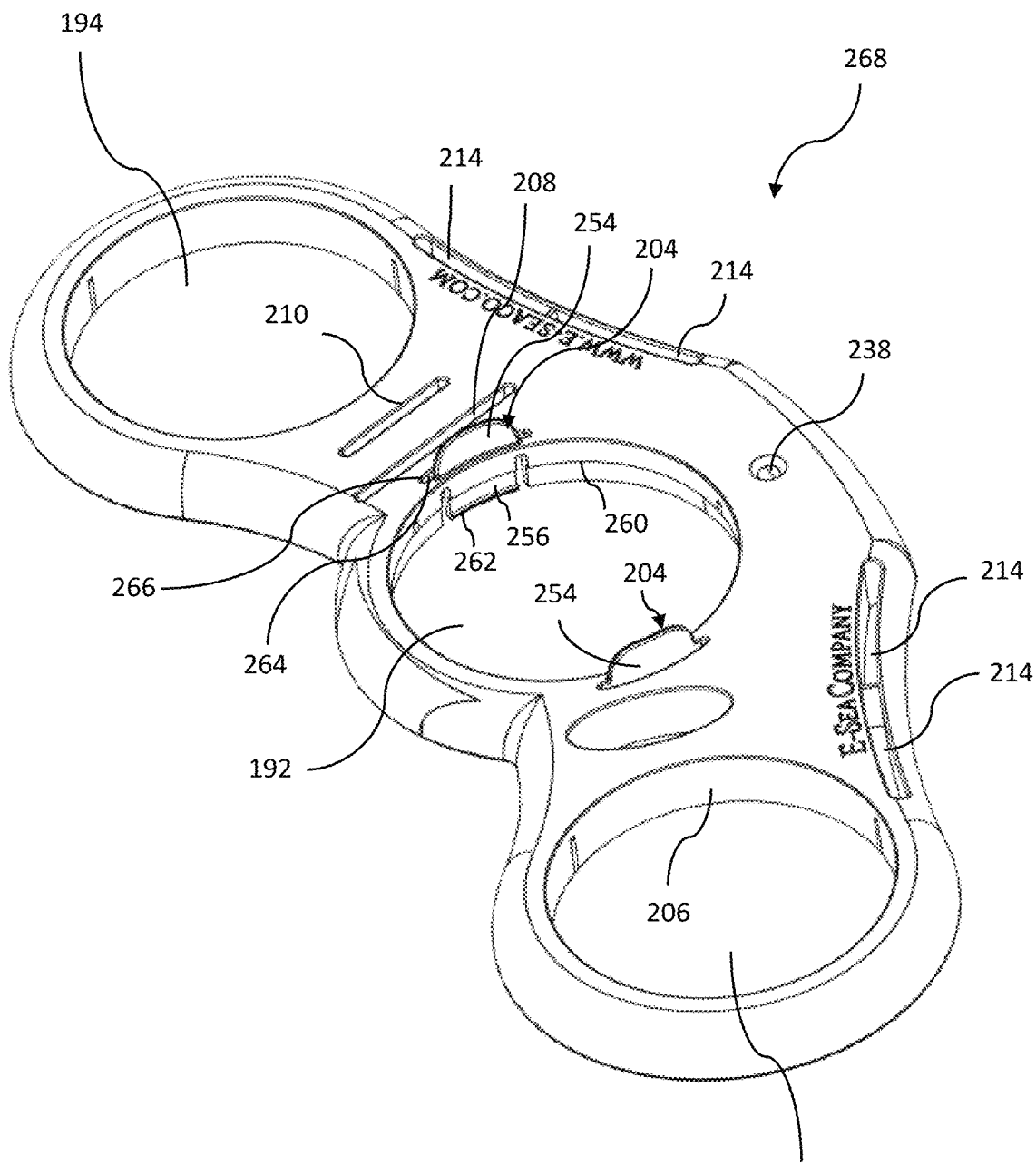
FIG. 21 is a perspective view of the multi-cup accessory of FIG. 20.
Figure 22:
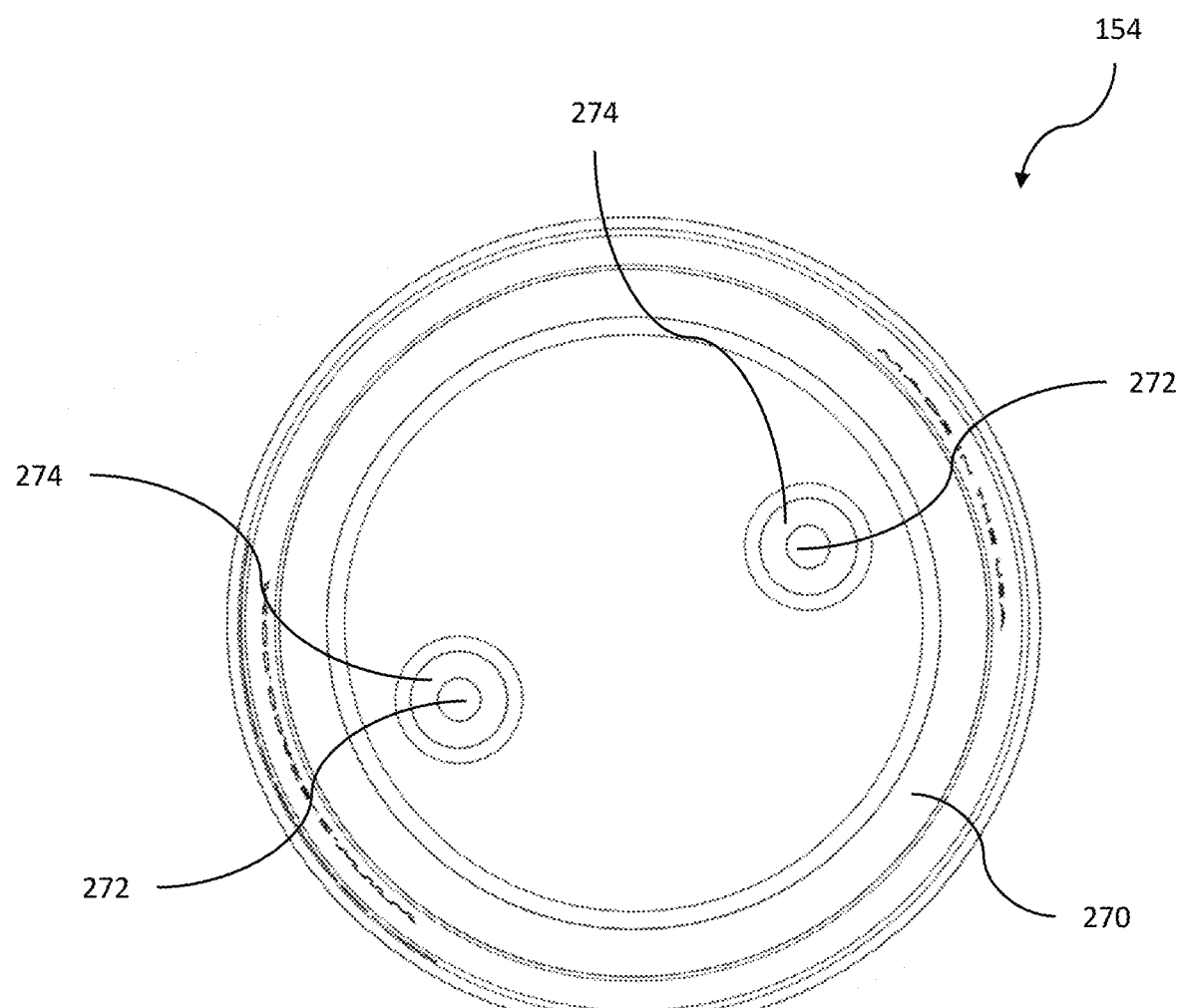
FIG. 22 is a plan view of the cup accessory of FIG. 14.
Figure 23:
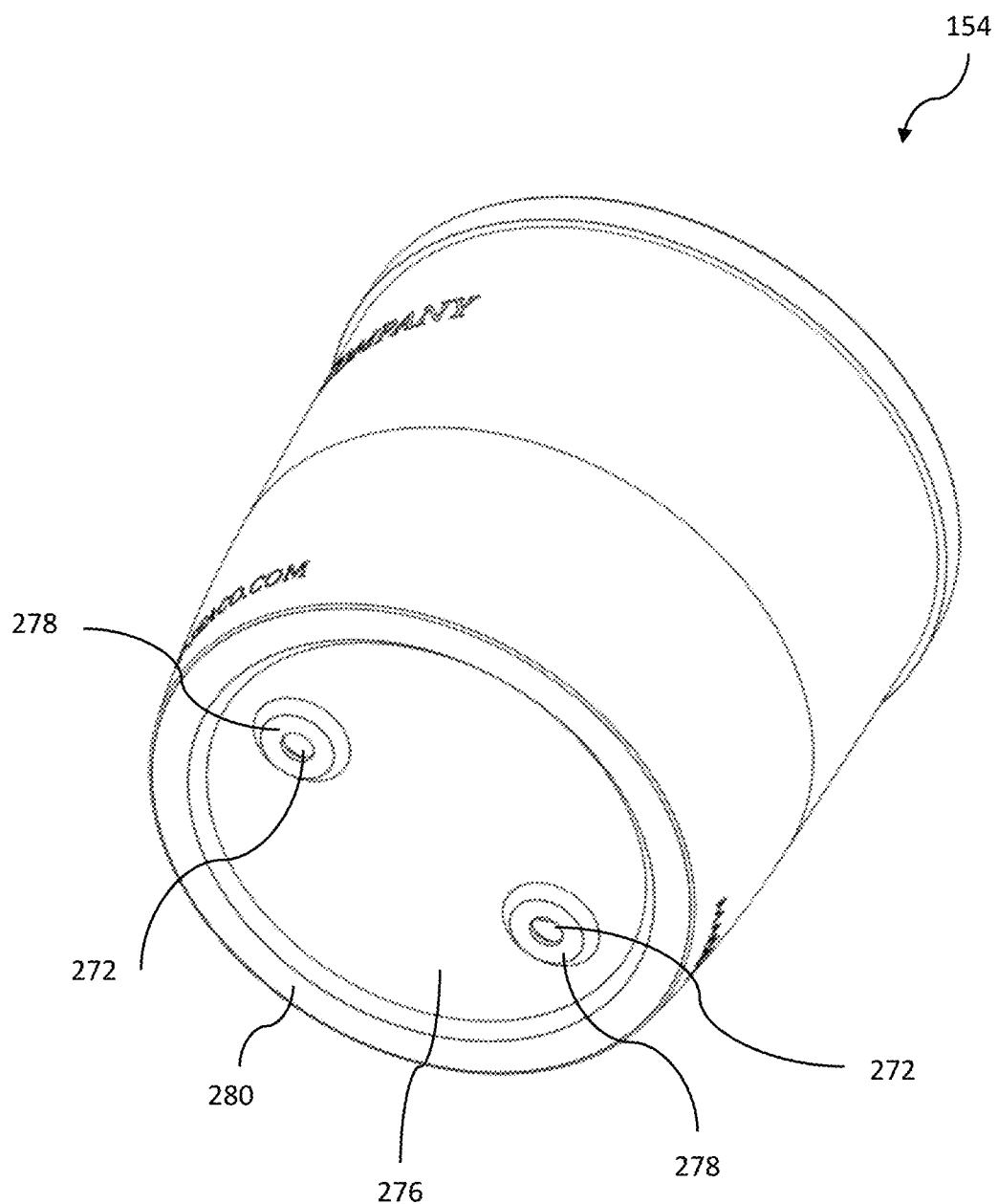
FIG. 23 is a bottom perspective view of the cup accessory of FIG. 14.

With reference to FIGS. 12 and 13, there is illustrated a single cup holder assembly 148 mounted to the suction mount 10 with the adjustable angle mount 100. The single cup holder assembly 148 includes a cup holder ring 150 and mounting arm 152. If the cup is large enough, it can be placed directly in the cup holder ring 150. Otherwise, a cup accessory 154, as shown in FIG. 14, can be placed in the cup holder ring 150. The cup accessory 154 is shaped like a cup and includes a bottom 156, an annular side wall 158 and an upper rim 160. The side wall 158 has a diameter that is smaller than an inner diameter of the cup holder ring 150 and may be tapered. The rim 160 includes an annular flange 162 that has an outer diameter larger than the inner diameter of the cup holder ring 150. The flange 162 includes a bottom surface 164 that rests on an upper surface 166 of the cup holder ring 150 to support the cup accessory 154. An inner surface 168 of the cup holder ring 150 may include ribs 170 that engage the side wall of the cup accessory 154 to control the amount of friction engagement between the cup holder ring 150 and the cup accessory 154.

The mounting arm 152 is stepped and includes an arcuate landing 172 and a serrated face 174 perpendicular to the landing 172. The arm 152 defines an attachment hole 176 and serrations of the serrated face 174 extend radially from the attachment hole 176. The other end of the arm 152 is attached to the cup holder ring 150. The arm 152 could be molded as a single piece with the cup holder ring 150 or could be two pieces attached together using welding, adhesive or other known techniques. When molded as a single piece, a pocket 178 may be added at a transition between the cup holder ring 150 and the mounting arm 152 to reduce the amount of material using to make the single cupholder accessory 148. The pocket 178 is bordered by the cup holder ring 150, the mounting arm 152 and three walls 180, 182, 184 interconnecting the cup holder ring 150 to the mounting arm 152.

The mounting arm 152 can cooperate with the adjustable angle mount 100 to attach the mounting arm 152 to the mount body 12 of the suction mount 10. The serrated faces 114, 174 cooperate with one another, and the holes 116, 174 align so that a thumb screw can secure the mounting arm 152 and the bracket 100 together at the desired angle. The thumb screw can be loosened to allow the serrations of the serrated faces 114, 174 to pass by one another to change the relative angle. If the terminal end 118 of the bracket 100 is arcuate, then it can easily move in the arcuate landing 172 of the mounting arm 172.

Referring to FIGS. 15-19, there is illustrated a multi-cup holder accessory 186 mounted to the suction mount 10 with the adjustable angle mount 100. The multi-cup holder accessory 186 has a body 188 with generally boomerang shape defining three cup holder openings 190, 192, 194 and a mounting arm 196. If the cup is large enough, it can be placed directly in the cup holder openings 190, 192, 194. Otherwise, the cup accessory 154, as shown in FIG. 14, can be placed in the cup holder openings 190, 192, 194. The bottom surface 164 of the flange 162 of the cup accessory 154 can rests on an upper surface 198 of the body 188 around each of the cup holder openings 190, 192, 194. Alternatively, the cup 154 can be locked in the center cup holder opening 192 with a pair of locking arms 204, as discussed further below. An inner surface 200 of the body 188 defining each of the cup holder openings 190, 192, 194 may include ribs 202 that engage the side wall of the cup accessory 154 to control the amount of friction engagement between the body 188 at the cup holder openings 190, 192, 194 and the cup accessory 154.

The body 188 may define other openings to hold additional items. These other openings can be sized as desired to hold items used for a specific activity. By way of example only, the additional openings could be designed to hold items commonly used in fishing. In this regard, the body 188 could define an oval opening 206 between two of the cup holder openings 190, 192 that would receive a portion of a pliers to support the pliers. The body 188 may also define a pair of elongated slots 208, 210 of different lengths between two openings 192, 194 to receive in part different sized knives to hold the knives. Along the front lip 212, the body 188 may define elongated, arcuate openings 214 for supporting fishhooks. The underside of the body 188 includes an array of recesses to reduce the amount of material used in making the body 188. The body 188 includes an annular wall 190a, 192a, 194a, 206a, 208a, 210a, 214a at each of the openings 190, 192, 194, 206, 208, 210, 214, respectively, to provide support for and depth to the openings 190, 192, 194, 206, 208, 210, 214 so that the items mounted in the openings 190, 192, 194, 206, 208, 210, 214 do not lean too much.

The mounting arm 196 is stepped and includes a flat landing 216 and a serrated face 218 perpendicular to the landing 216. The arm 196 defines an attachment hole 220 and serrations of the serrated face 218 extend radially from the attachment hole 220. The other end of the arm 196 is attached to the body 188. The arm 196 could be molded as a single piece with the body 188 or could be two pieces attached together using welding, adhesive or other know techniques. When molded as a single piece, pockets 222 may be added at a transition between the body 188 and the mounting arm 196 to reduce the amount of material used to make the multi-cup accessory 186. The pockets 222 are bordered by the body 188, the mounting arm 196 and a number of walls 224 interconnecting the body 188 to the mounting arm 196.

The mounting arm 196 can cooperate with the adjustable angle mount 100 to attach the mounting arm 196 to the mount body 12 of the suction mount 10. The serrated faces 114, 218 cooperate with one another, and the holes 116, 220 align so that a thumb screw can secure the mounting arm 196 and the angle mount 100 together at the desired angle. The thumb screw can be loosened to allow the serrations of the serrated faces 114, 218 to move pass one another to change the relative angle.

An additional mounting plate 226 may be added to depend from the body 188 if desired. The mounting plate 226 includes a rectangular base 228 that fits into a complimentary rectangular pocket 230 at the underside of the body 188. The base 228 includes a mounting hole 232 and a pocket 234 that holds a nut 236 in alignment with the mounting hole 232. The nut 236 may fit in the pocket 234 with a friction fit. The body 188 includes a mounting hole 238 that aligns with the mounting hole 232 of the plate 226 to receive a threaded fastener 240 to attach the plate 226 to the body 188. The plate 226 includes a front face 242 with two mounting holes 244. At the rear side, the plate 226 defines two pockets 246, each to hold a nut 248 in alignment with its respective mounting hole 244. The nut 248 may fit in its pocket 246 with a friction fit. The spacing between the mounting holes 244 may be designed to mount a specific accessory, including, for example, a conventional bottle opener. The rear of the mounting plate 226 may include recesses 250 to reduce the amount of material.

As mentioned above, the center cupholder opening 192 may include locking arms 204 to attach the cup 154 (FIG. 14) to the body 188 so that it cannot be unintentionally dislodged. Each locking arm 204 includes a locking portion 252 and a tab 254. The locking portion 252 includes an arcuate channel 256 bounded by a lower rib 258 and upper wall 260. The lower rib 258 includes a cam surface 262 so that the cup 154 can be inserted into the opening 192 from underneath the body 188. As the cup 154 is inserted into the locking arms 204, the lower portions 252 pivot outward until the flange 162 of the cup 154 passes into the channel 256. The outward movement of the lower portions 252 is caused by the camming of the flange 162 over the cam surface 262. The locking arms 204 are connected to the body 188 by relatively small extensions 264 of material that allow the locking arms 204 to pivot and elastically return to a holding position. The body 188 defines an arcuate opening 266 to provide clearance for the locking arm 204 to pivot. The tabs 254 are used to release the cup 154 from the locking arms 204. The tabs 254 are squeezed towards one another to pivot the channel 256 of the locking portion 252 away from the flange 162 of the cup 154. This movement allows the cup 154 to drop out of the locking engagement with the locking arms 204.

As shown in FIGS. 20-23, there is another multi-cup accessory 268 identical to the multi-cup accessory 186 except that this multi-cup accessory 268 does not include the mounting arm 196. This multi-cup accessory 268 can be used with the suction mount 10 and the cup accessory 154 to mount the multi-cup accessory 268 on horizontal surfaces, as described further below. The same reference numbers are used for this multi-cup accessory 268 for similar components of the previously described multi-cup accessory 186.

The cup accessory 154 includes a bottom wall 270 defining a pair of mounting holes 272. Each mounting hole 272 includes a countersunk portion 274 so that heads of the screws can sit flush with the bottom wall 270. An underside 276 of the bottom wall 270 may include a boss 278 around each of the mounting holes 272 and a raised perimeter region 280 around its circumference. The mounting holes 272 of the bottom wall 270 align with the mounting holes 16 of the mount body 12 to attach the cup accessory 154 to the suction mount 10. The cup accessory 154 locks into the center cup holder opening 192 using the locking arms 204, as described above.

The components described above may be made from a plastic or metal material. For example, the suction cup could be made of all plastic so that it does not rust. In this case, the suction cup may be made of polyvinyl chloride, and the threaded post and the mount body may be made of acrylonitrile butadiene styrene.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:
1. A suction mount system comprising:
a suction cup having a first perimeter region; and
a one-piece body rotatably connected to the suction cup and having a rib extending from a second perimeter region that movably engages and embeds into a material of the suction cup at the first perimeter region of the suction cup when the rib is rotated with the one-piece body to resist movement of the first perimeter region along a mounting surface as a center portion of the suction cup is pulled away from the mounting surface as the suction cup is mounted to the mounting surface, wherein the one-piece body comprises an outer annular wall having an exterior side and an interior side, and a plurality of longitudinal ribs extend lengthwise along the interior side substantially parallel to a central longitudinal axis of the one-piece body, at least one of the plurality of longitudinal ribs including at least one ridge at an end thereof to embed into the suction cup.

2. The suction mount system of claim 1 wherein the ridge is a discontinuous annular ridge.

3. The suction mount system of claim 1, wherein the rib is a first continuous annular rib that embeds into the material of the suction cup at the first perimeter region of the suction cup.

4. The suction mount system of claim 3 further comprising a second continuous annular rib that embeds into the first perimeter region of the suction cup.

5. The suction mount system of claim 1 further comprising a threaded shaft mechanically connecting the suction cup to the one-piece body such that rotating of the one-piece body embeds the rib into the material of the suction cup at the first perimeter region of the suction cup.

6. The suction mount system of claim 5 further comprising a base at least partially molded into the suction cup and attached to the threaded shaft to attach the threaded shaft to the suction cup.

7. The suction mount system of claim 6 wherein the one-piece body defines a hole that is at least partially threaded and receives the threaded shaft.

8. The suction mount system of claim 1 wherein the one-piece body defines mounting holes for attaching accessories to the one-piece body.

9. The suction mount system of claim 8 further comprising a threaded nut at each of the mounting holes.

10. The suction mount system of claim 9 further including a bracket that mounts to the one-piece body using the mounting holes.

11. The suction mount system of claim 10 wherein the bracket defines a plurality of holes.

12. The suction mount system of claim 11 wherein at least two of the plurality of holes are elongated slots.

13. The suction mount system of claim 10 wherein the bracket includes at least two protrusions extending away from one another.

14. The suction mount system of claim 10 wherein the bracket includes a serrated face for mounting accessories at different angles relative to the one-piece mount body.

15. The suction mount system of claim 1 wherein the one-piece body defines a recess and a magnet resides in the recess.

16. The suction mount system of claim 1 further comprising a first accessory defining at least one hole for supporting an object.

17. The suction mount system of claim 16 wherein the at least one hole includes a plurality of holes for supporting different sized objects at the same time.

18. The suction mount system of claim 16 further comprising a second accessory supported by the first accessory and defining a plurality of holes for supporting different sized objects at the same time.

19. The suction mount system of claim 18 further comprising a third accessory supported by the second accessory for supporting at least one object.

20. A method for attachment to a surface comprising:
providing a suction cup having a first perimeter region and a one-piece mount body rotatably connected to the suction cup and the mount body having a rib extending from a second perimeter region;
placing the suction cup against a surface;
rotating the one-piece body; and
movably engaging and embedding the rib into a material of the suction cup at the first perimeter region of the suction cup when the rib is rotated with the one-piece body to resist movement of the first perimeter region along a mounting surface as a central portion of the suction cup is pulled away from the mounting surface as the suction cup is mounted to the mounting surface, wherein the rib is a discontinuous annular rib and the mount body further includes a first continuous annular rib and a second continuous annular rib, and further comprising the step of embedding the discontinuous annular rib, the first continuous annular rib and the second continuous annular rib into the material of the suction cup at the first perimeter region of the suction cup upon rotating of the mount body.

21. The method of claim 20 further comprising the step of providing a threaded shaft mechanically connecting the suction cup to the mount body such that rotating of the mount body embeds the discontinuous annular rib, the first continuous annular rib and the second continuous annular rib into the material of the suction cup at the first perimeter region of the suction cup.

22. The method of claim 20 further comprising the step of attaching an accessory bracket to the mount body.

23. The method of claim 22 wherein the bracket includes a serrated face for mounting accessories at different angles relative to the mount body.

24. The method of claim 22 further comprising the step of attaching a first accessory defining at least one hole for supporting an object to the bracket.

25. The method of claim 24 wherein the at least one hole includes a plurality of holes for supporting different sized objects at the same time.

26. The method of claim 24 further comprising the step of attaching a second accessory to the first accessory and the second accessory defining a plurality of holes for supporting different sized objects at the same time.

27. A mount for a suction mount system comprising:
a one-piece body,
the one-piece body comprising at least one rib projecting from the one-piece body to engage a suction cup, wherein the at least one rib is fixed against movement relative to the one-piece body such that the rib rotates with the one-piece body when the one-piece body is rotated to engage the suction cup; and
a core of the one-piece body defining a hole that is at least partially threaded to rotatably couple the one-piece body to a threaded portion of the suction cup so rotation of the one-piece body drives axial movement of the threaded portion of the suction cup, and defining an axis about which the one-piece body rotates,
wherein the one-piece body comprises an outer annular wall having an exterior side and an interior side, and a plurality of longitudinal ribs extend lengthwise along the interior side substantially parallel to the axis, at least one of the plurality of longitudinal ribs including at least one ridge at an end thereof to embed into the suction cup.

28. The mount of claim 27 wherein the at least one ridge is discontinuous.

29. The mount of claim 27 wherein the at least one rib is a first continuous annular rib projecting from the one-piece body to engage the suction cup.

30. The mount of claim 29 further comprising a second continuous annular rib projecting from the one-piece body to engage the suction cup.

31. The mount of claim 27 wherein the one-piece body defines mounting holes for attaching accessories to the one-piece body.

32. The mount of claim 28 further comprising at least one pocket formed by the one-piece body adjacent the discontinuous ridge.

33. The mount of claim 27 wherein the one-piece body defines at least one recess to enhance gripping for rotating the one-piece body about the axis.

34. The suction mount system of claim 1 wherein a diameter of the one-piece body at the second perimeter region is less than or equal to a diameter of the suction cup at the first perimeter region.

35. The method of claim 20 wherein a diameter of the one-piece body at the second perimeter region is less than or equal to a diameter of the suction cup at the first perimeter region.

* * * * *